(12) United States Patent
Ruehl

(10) Patent No.: US 8,720,924 B2
(45) Date of Patent: May 13, 2014

(54) AUXILIARY STEP AND HAND HOLD SYSTEM

(76) Inventor: Phillip C. Ruehl, Elm Grove, WI (US)

(*) Notice: Subject to any disclaimer, the term of this patent is extended or adjusted under 35 U.S.C. 154(b) by 686 days.

(21) Appl. No.: 12/494,931

(22) Filed: Jun. 30, 2009

(65) Prior Publication Data

US 2009/0322052 A1 Dec. 31, 2009

Related U.S. Application Data

(63) Continuation-in-part of application No. 11/554,885, filed on Oct. 31, 2006, and a continuation-in-part of application No. 12/410,583, filed on Mar. 25, 2009, now abandoned.

(60) Provisional application No. 60/731,749, filed on Oct. 31, 2005, provisional application No. 60/832,453, filed on Jul. 21, 2006, provisional application No. 61/039,617, filed on Mar. 26, 2008, provisional application No. 61/076,832, filed on Jun. 30, 2008, provisional application No. 61/076,831, filed on Jun. 30, 2008.

(51) Int. Cl.
*B60R 3/00* (2006.01)
*B60R 3/02* (2006.01)

(52) U.S. Cl.
USPC ........................................ 280/164.1; 280/166

(58) Field of Classification Search
USPC ......... 280/163, 164.1, 166; 296/1.02; 182/97, 182/106, 127
See application file for complete search history.

(56) References Cited

U.S. PATENT DOCUMENTS

| 90,584 | A | | 5/1869 | Roberts | |
| 384,665 | A | | 6/1888 | Zistel | |
| 1,118,584 | A | | 11/1914 | Roebuck | |
| 1,525,679 | A | | 2/1925 | Weber | |
| 2,146,668 | A | * | 2/1939 | Baade | 105/447 |
| 3,097,388 | A | | 7/1963 | Gresko | |
| 3,190,392 | A | * | 6/1965 | Ashton et al. | 182/97 |
| 3,416,836 | A | * | 12/1968 | Swanby | 296/148 |
| 3,507,515 | A | | 4/1970 | Brammer | |
| 3,528,574 | A | * | 9/1970 | Denner et al. | 414/558 |
| 4,029,352 | A | * | 6/1977 | Evans | 296/156 |

(Continued)

FOREIGN PATENT DOCUMENTS

| JP | 06305363 | 11/1994 |
| JP | 2000-318547 | 11/2000 |
| JP | 2001-138961 | 5/2001 |
| KR | 10-2006-0017137 | 2/2006 |

*Primary Examiner* — J. Allen Shriver, II
*Assistant Examiner* — Bridget Avery
(74) *Attorney, Agent, or Firm* — Nicholas A. Kees; Godfrey & Kahn, S.C.

(57) ABSTRACT

An auxiliary step and hand hold system for accessing a vehicle. The system includes at least one auxiliary step, at least one hand hold shaped to assist a climb into the trailer, and at least one pocket shaped to removably receive the at least one hand hold. The auxiliary step may be a rotating-retractable step that rotates between a use position and a stowed position. The hand hold is shaped to assist a climb into the cargo bay and may be inserted into the pockets in a use position and a stowed position. One or more stationary steps can also be used in connection with a preferred embodiment of the present invention. The hand holds, pockets and auxiliary steps may be used alone or in combination to assist with access to a vehicle.

19 Claims, 24 Drawing Sheets

(56) References Cited

U.S. PATENT DOCUMENTS

| | | | |
|---|---|---|---|
| 4,169,623 A * | 10/1979 | Smith | 296/1.04 |
| 4,347,638 A * | 9/1982 | Weaver | 14/71.1 |
| 4,605,098 A | 8/1986 | Leuty | |
| D293,667 S | 1/1988 | Weiler | |
| D296,431 S | 6/1988 | Yont | |
| 4,749,191 A * | 6/1988 | Gipson et al. | 280/164.2 |
| 4,785,910 A | 11/1988 | Tonkovich | |
| 4,935,638 A | 6/1990 | Straka | |
| D312,810 S | 12/1990 | Preslik et al. | |
| 5,007,654 A | 4/1991 | Sauber | |
| 5,024,420 A * | 6/1991 | Downing | 256/67 |
| 5,026,082 A * | 6/1991 | Sipp et al. | 280/163 |
| 5,028,063 A * | 7/1991 | Andrews | 280/166 |
| 5,046,582 A * | 9/1991 | Albrecht | 182/127 |
| 5,092,617 A | 3/1992 | Jones | |
| 5,139,295 A | 8/1992 | Escobedo | |
| 5,205,603 A * | 4/1993 | Burdette, Jr. | 296/62 |
| 5,280,934 A * | 1/1994 | Monte | 280/166 |
| 5,284,349 A | 2/1994 | Bruns et al. | |
| 5,326,203 A | 7/1994 | Cockrell | |
| 5,620,059 A | 4/1997 | Crispeno | |
| 5,803,475 A | 9/1998 | Dick | |
| 5,944,332 A | 8/1999 | Lee et al. | |
| 6,003,633 A * | 12/1999 | Rolson | 182/127 |
| 6,318,773 B2 | 11/2001 | Storer | |
| 6,321,873 B1 * | 11/2001 | LaBrash | 182/127 |
| 6,425,572 B1 * | 7/2002 | Lehr | 256/1 |
| 6,581,946 B2 | 6/2003 | Lund et al. | |
| 6,655,706 B1 | 12/2003 | Murrell | |
| 6,974,134 B1 * | 12/2005 | Macri et al. | 296/1.02 |
| 7,007,366 B1 * | 3/2006 | Eby | 29/436 |
| 7,025,174 B1 * | 4/2006 | Hawley | 182/88 |
| 2002/0003340 A1 * | 1/2002 | Hallquist | 280/163 |
| 2002/0030377 A1 | 3/2002 | Anderson | |
| 2002/0189903 A1 * | 12/2002 | Krish, Jr. | 182/206 |
| 2003/0071434 A1 * | 4/2003 | Budd | 280/166 |
| 2004/0061301 A1 | 4/2004 | Andrews | |
| 2004/0178602 A1 * | 9/2004 | King et al. | 280/163 |
| 2007/0108718 A1 | 5/2007 | Ruehl | 280/163 |
| 2008/0136208 A1 * | 6/2008 | Kuznarik et al. | 296/62 |
| 2010/0052354 A1 | 3/2010 | MacLeod et al. | |

\* cited by examiner

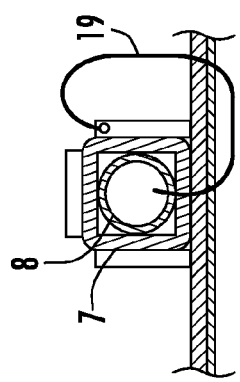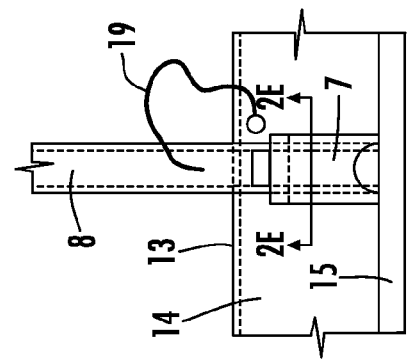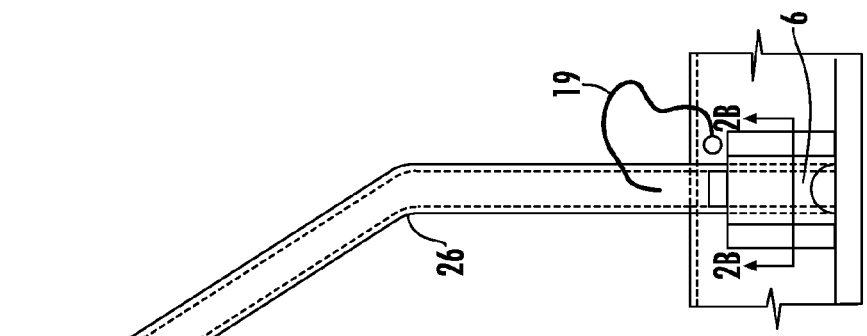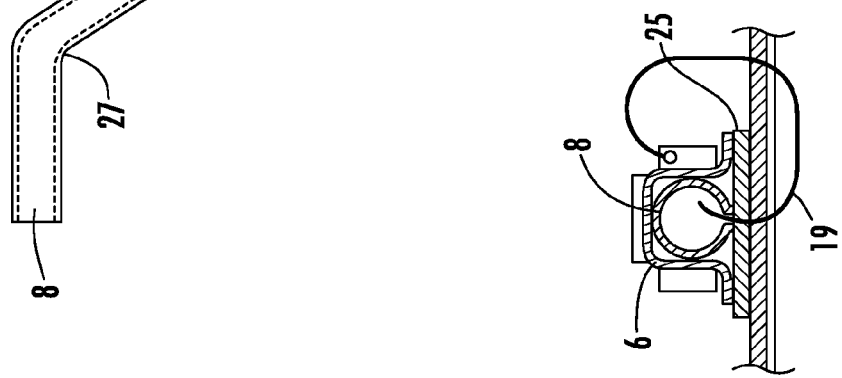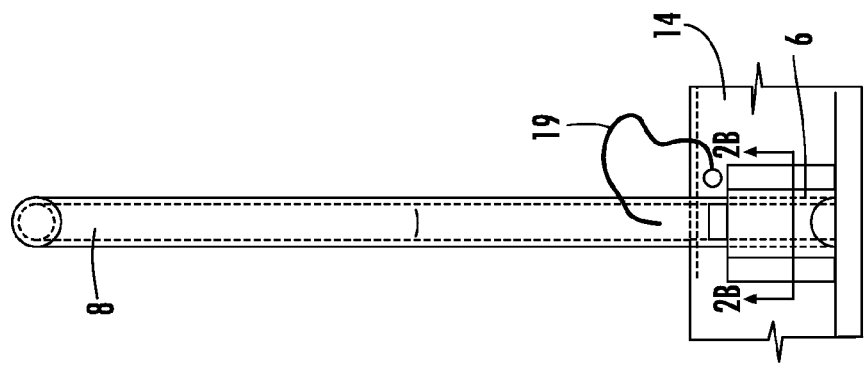

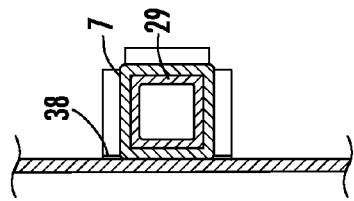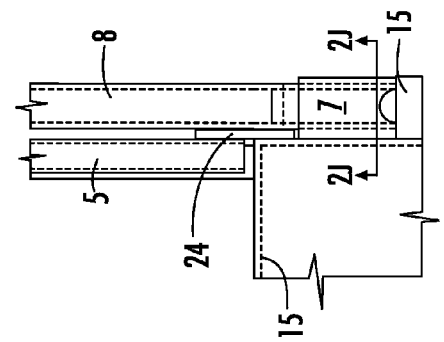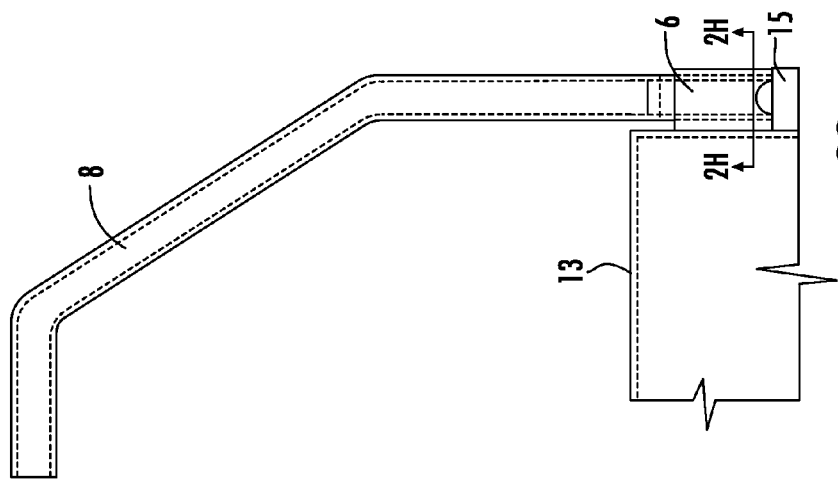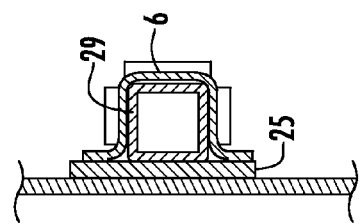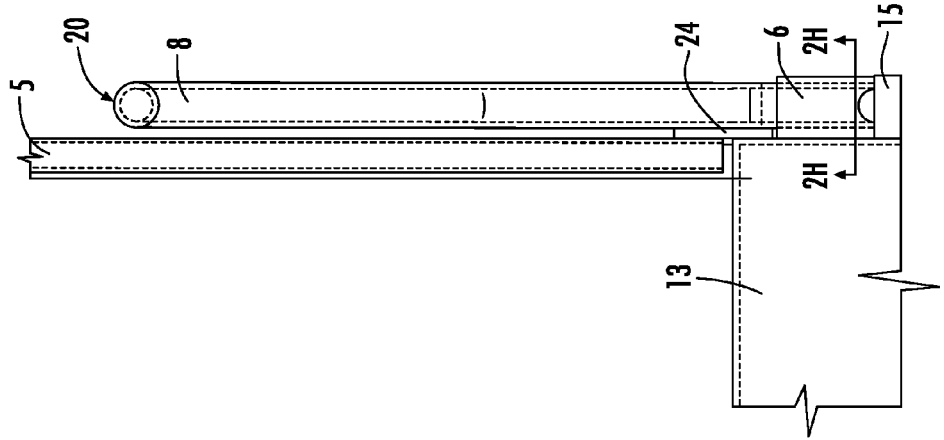

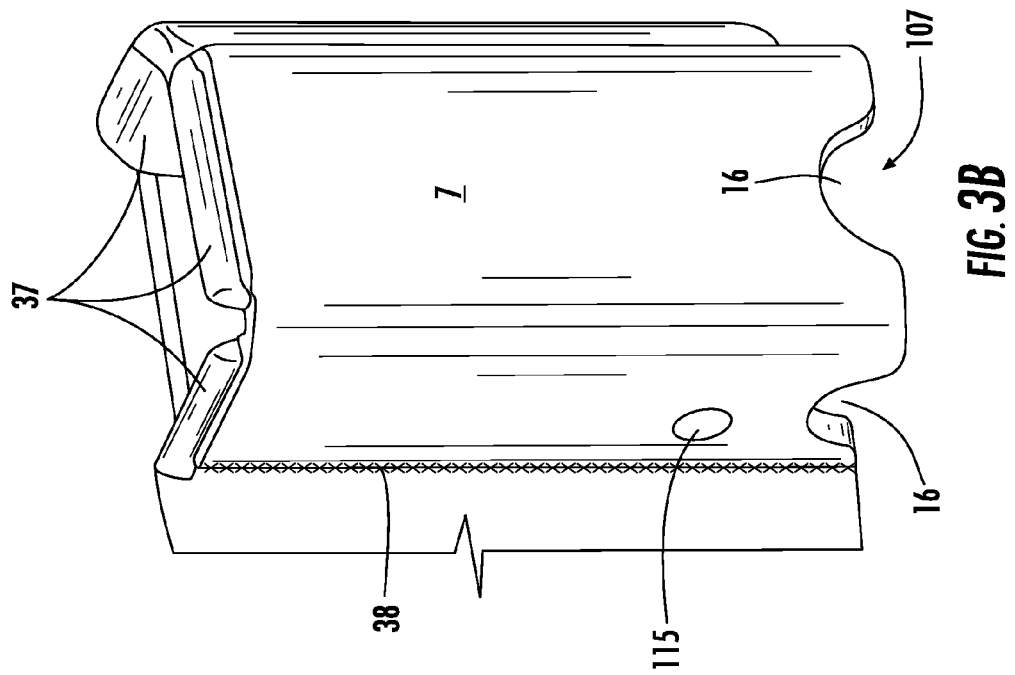
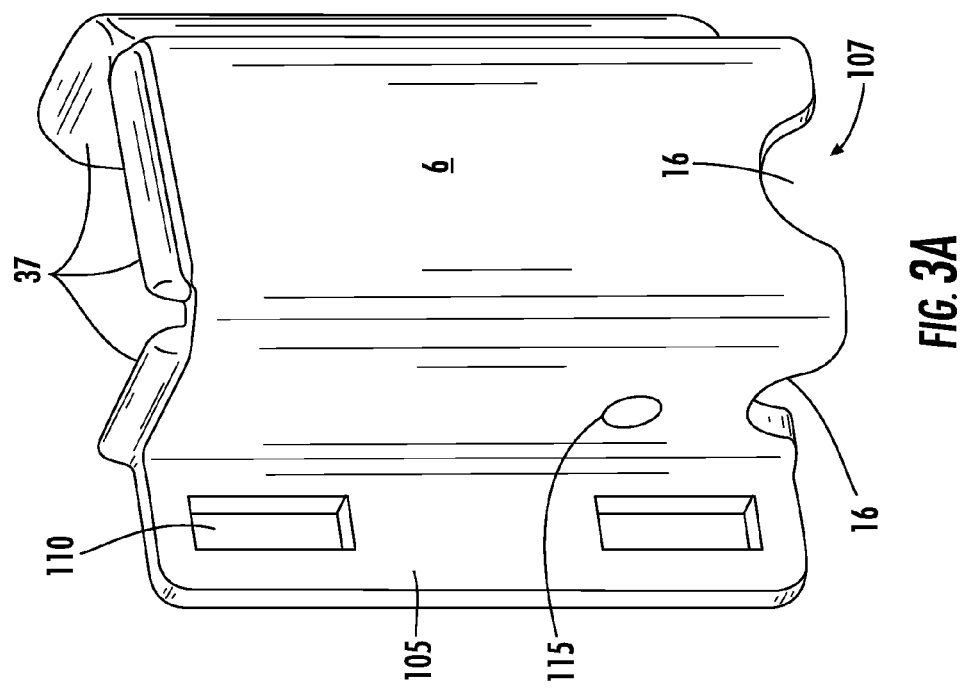

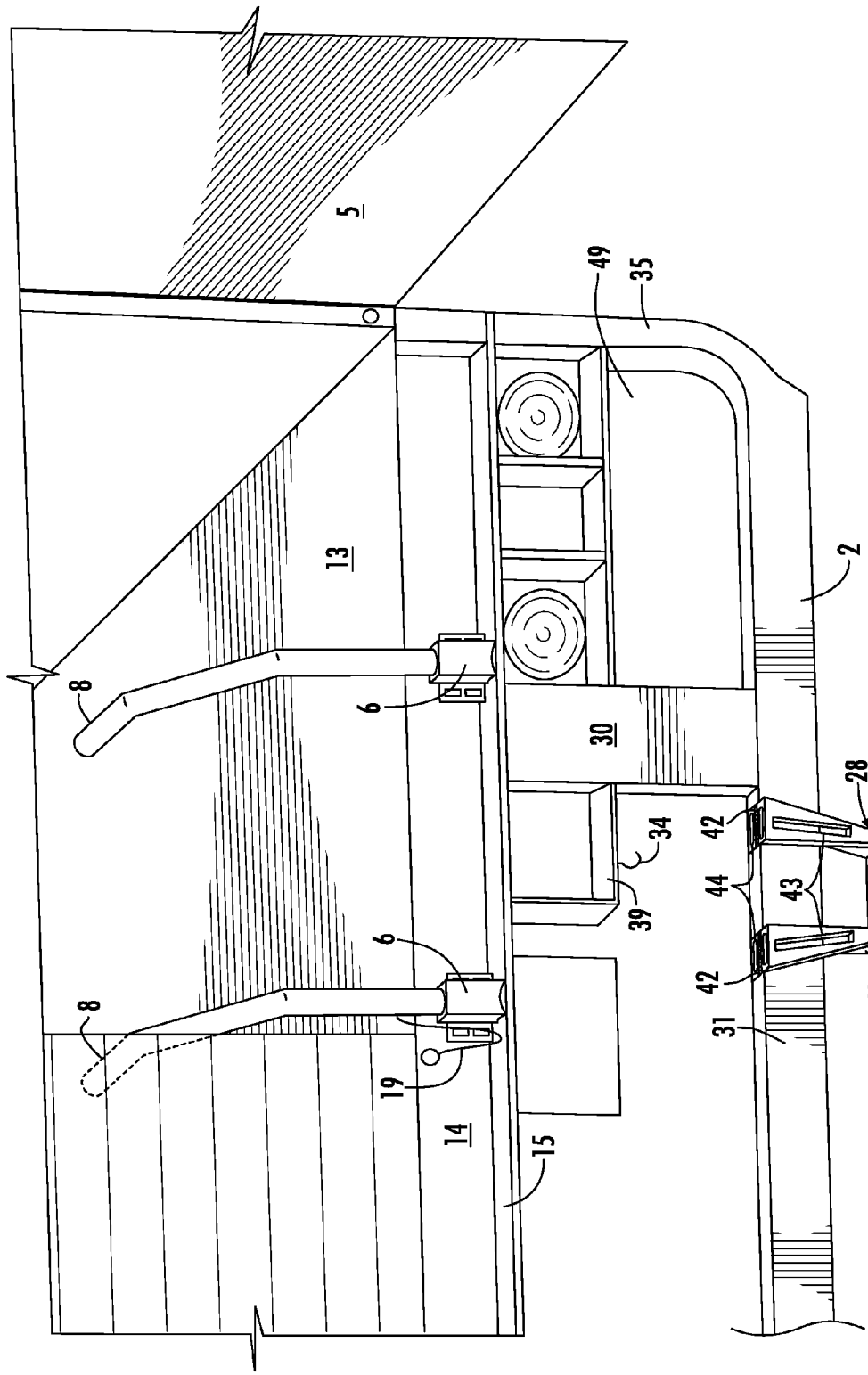

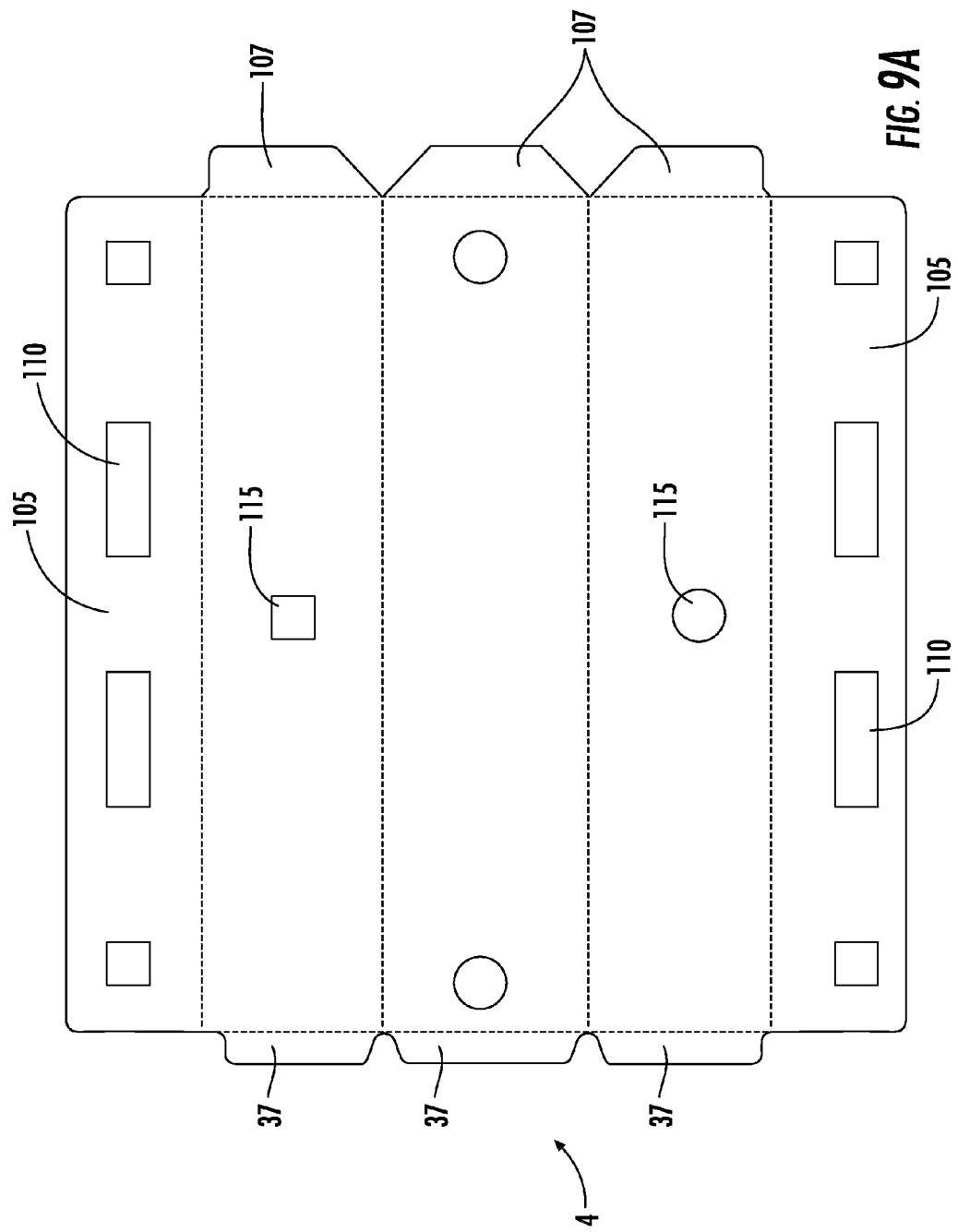

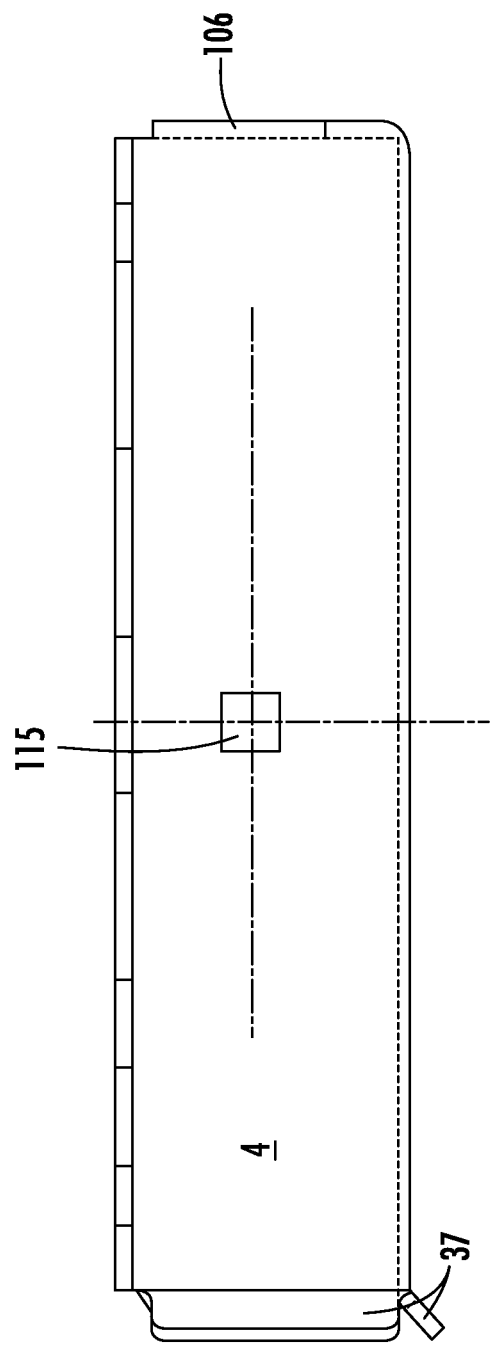

AUXILIARY STEP AND HAND HOLD SYSTEM

CROSS-REFERENCE TO RELATED APPLICATIONS

This application is a continuation-in-part of U.S. patent application Ser. No. 11/554,885, filed on Oct. 31, 2006, and U.S. patent application Ser. No. 12/410,583, filed on Mar. 25, 2009, and is based on U.S. Provisional Patent Application No. 61/039,617, filed on Mar. 26, 2008, and U.S. Provisional Patent Application Nos. 61/076,832 and 61/076,831, filed on Jun. 30, 2008, all of which are incorporated herein by reference for all purposes.

FIELD OF THE INVENTION

The present invention is directed generally to accessories for accessing a vehicle such as a tractor, trailer or truck.

BACKGROUND OF THE INVENTION

There are about five to six million semi-trailers in use in the U.S., and a similar number of Class 5, 6, and 7 straight rail medium and heavy trucks, and class 8 tractors. These tractors, trucks and trailers are produced by several domestic and foreign truck manufacturers, and each manufacturer typically offers multiple models and styles. Despite the large number of tractors and trucks in use and the wide variety of models and styles available, virtually all of the trailers and most of the trucks have an elevated bed that can be difficult to access. As a result, falls from cabs, trailers, and 5th-wheel "catwalks" are the leading cause of insurance claims in the commercial trucking industry. Such falls can cause severe and debilitating injury, and even death.

A typical trailer floor is 48" above the ground, often with only the 24" under-ride guard beam mandated by the Interstate Commerce Commission (ICC beam) to assist in the climb, making access to the cargo bay difficult. The ICC beam is required to be located at the back of trailers to prevent the front end of a car, crashing into the rear end of a trailer, from passing under the trailer floor, and shearing off the passenger compartment at about shoulder level. This beam, usually a very robust 4"×4" steel box section, often spans the full 102" width of the rear trailer, and is suspended from below the trailer floor by, usually two, comparably robust, vertical steel supports. A car impacting the ICC beam would dissipate energy through bending of the ICC beam support structure, and would activate seat-belt-locks, air-bags, and other energy-dissipating features of the car—giving car passengers the best chance for survival.

The ICC beam's height has been standardized at about 24" above ground, with its rear face roughly in-plane with the other features of the trailer's rear structure. The aft edge of the cargo floor, and the aft face of the cargo door, are set about 2" forward of the ICC beam, to avoid contact during a typical cargo-dock bump. The ICC beam serves as a positive stop when backing into some dock walls. Other docks may have a mechanical "catcher" that firmly clamps the beam at its center during load/unload to maintain tight contact between the trailer and the dock.

When the cargo bay must be accessed in the absence of a dock, the upper surface of the ICC beam often becomes the only intermediate step between the ground and the 48"-high floor. The top of the ICC beam usually has traction holes to facilitate this climb. Nonetheless, the two 24" steps are a daunting climb for anyone. This difficult task is compounded for shorter, older, heavier, or physically-challenged operators.

Similarly, a heavy truck cab floor is typically about 50 inches above the ground, with two steps in-between—i.e., the steps have 17" risers. By comparison, steps in a home or office usually have 7" risers, and ladder rungs are usually 12" apart. This significant height of the steps is one factor that makes truck cabs and trailers difficult to access.

To address this problem, one or more add-on steps can be used. Some existing trailers include a welded or bolted step, tucked forward, above the ICC beam at its center span, or at its far right hand (RH) side, to help facilitate the climb. While helpful, this step does nothing to attenuate the obstacle posed by the first 24" step. Complicated, multi-link, retractable two-step aids have been on the market for some time. However, these suffer from cost and complexity of product, and of their assembly to the trailer; and any bending of the links, or severe rusting, make them inoperable.

Even with any type of add-on step alone, the climb is difficult because there is generally no standard hand hold or other auxiliary hand hold that can be safely, efficiently and effectively used. As previously noted, a typical step riser in a home or commercial building is 7" tall. The typical rungs on a ladder are 12" apart. Both offer continuous hand holds—residential and commercial building steps generally have continuous railings, and the ladder has one rail for each hand. Two points determine a line, about which one can spin out-of-balance. Three non-linear points set a stable plane. As a result, the Society of Automotive Engineers (SAE) recommends in Section 4.7 of SAE J-185 that access systems such as steps, ladders, and grab rails to, on, and from vehicle platforms and walkways, should be designed to allow the person using them to have three points of contact on the system at all times (two hands and one foot, or two feet and one hand). In order to continuously maintain the SAE-recommended "three points of contact" for preventing falls, four points of contact must be provided, as the climb requires the sequential release and raising of each limb. Many cabs and catwalks do not provide two hand holds that extend vertically in proportion to the above climbs. Virtually no trailers do.

On a relatively few existing trailers, hand holds have been added to the right-hand (RH) edge of the cargo box (the RH door opens first in a hinged-door trailer). Even fewer trailers offer a vertical hand hold bolted near the center edge of the left-hand (LH) door. Generally none have both, as their span is about 55"—very hard to use together, similar to executing an "iron-cross" in gymnastics. In either case, their mounting, slightly aft of the rear floor-edge, also forces the climber's center of gravity (CG) back, with the feet further forward—inducing a backward lean, and biasing any slip into becoming a backward fall, often onto hard pavement.

Permanent handles on the door itself would also be out of position when the door is swung open, and if permanently mounted to the floor, would block opening of a trailer's double swinging doors. Some trailers have a garage-type "pull-up" rear door. In that instance, if a permanent hand hold were to be mounted to the outboard side edge of the trailer's rear surface, that would still provide only a single hand hold. Both hands need separate grips to maintain the SAE-recommended three-point contact, as one releases and lifts each limb sequentially during a climb.

SUMMARY OF THE INVENTION

The present invention provides an auxiliary step system for accessing a vehicle. The step system includes at least one auxiliary step having a stepping portion with two support legs and at least one mounting portion, at least one hand hold shaped to assist a climb into the trailer, and at least one pocket shaped to removably receive the at least one hand hold. The auxiliary steps, hand holds and pockets can be used alone or in combination to assist a climber with accessing a vehicle.

The auxiliary step system of the present invention is particularly useful for accessing the cargo bay of a trailer. Such a preferred embodiment of the present has a rotating-retractable step, first and second hand holds, and first and second pockets. The rotating-retractable step is mounted to the under-ride guard beam of the trailer, and has a use position and a stowed position. When the step is in the use position, it is positioned below the under-ride guard beam, and when the step is in the stowed position, it is rotated up and positioned above the under-ride guard beam. The first hand hold and second hand hold are each shaped to assist a climb into the cargo bay and can be inserted into the pockets in the use position and the stowed position. The first and second pocket are both mounted to the trailer underneath the closed doors and above the rotating-retractable step. Third and fourth pockets can also be mounted on the inside of the at least one door of the trailer, as it may be more convenient to stow the hand holds in that location. A first cable can be attached to the first hand hold and the trailer, and a second cable can be attached to the second hand hold and the trailer, to prevent the loss or theft of the hand holds.

The rotating-retractable step includes at least one mounting portion configured to be attached to the under-ride guard beam, a horizontal step member having at least an upwardly facing stepping surface (in its use position), and a pair of side supports extending between the at least one mounting portion and the horizontal step member. The side supports can be connected to the mounting portion with a hinge pin and pin retainer in a hinged fashion, or a pivot tab and pivot bolt or drive screw in a pivoted fashion. Using the hinged fashion, the pin retainer can be integrally formed with the side support and mounting portion. The upwardly facing stepping surface can have a plurality of holes formed along its outside edge. At least a portion of the holes can include a tooth that extends substantially perpendicular to the stepping surface for gripping a climber's boot or other footwear to prevent slips. The rotating-retractable step can also include a stepping surface with an edge support flange and a horizontal lip extending outwardly from the edge support flange that can act as a boot scraper.

One or more stationary steps, each with a horizontal step member, can also be used in connection with a preferred embodiment of the present invention. A stationary step can be mounted on the under-ride guard beam such that the horizontal step member of the stationary step is positioned above the under-ride guard beam and above the rotating-retractable step when the rotating-retractable step is in the use position. A stationary step could also be mounted in between the under-ride guard beam and the floor of the trailer, or underneath the under-ride guard beam.

The present invention also contemplates a hand hold system for accessing the cargo bay of a vehicle trailer. The hand hold system has a pair of pockets, a first hand hold and a second hand hold. The pockets are mounted on the trailer underneath a bottom rear edge of the floor and spaced apart from one another along a horizontal plane. The first and second hand holds are shaped to assist a climb into the trailer and can be inserted into the pockets in a use position and a stowed position, wherein the use position is rotated 90 degrees from the stowed position. The first and second hand holds are shaped to transfer a climber's center of gravity from a starting position below and behind the cargo bay area of the trailer to a final position inside the cargo bay area and forward of a rear edge of the trailer floor. A second pair of pockets shaped to receive the hand holds in the stowed position can also be mounted on an inside surface of the trailer door. The hand hold system can also include anti-rotational features such as a squared base and/or retainer pin and anti-theft features, such as cables secured to the hand holds and trailer, a stowage latch, and/or a locking mechanism.

BRIEF DESCRIPTION OF THE DRAWINGS

FIG. 2a is a rear view of a round tube hand hold according to one embodiment of the present invention, shown in the use position and installed in one embodiment of a hand hold pocket.

FIG. 2b is a cross-sectional view of the hand hold pocket of FIGS. 2a and 2c, taken along plane B-B in FIGS. 2a and 2c.

FIG. 2c is a rear view of a hand hold according to one embodiment of the present invention, shown in the stowed position in the hand hold pocket of FIG. 2a.

FIG. 2d is a rear view of another embodiment of a hand hold and hand hold pocket according to the present invention.

FIG. 2e is a cross-sectional view of the hand hold pocket of FIG. 2d, taken along line A-A in FIG. 2d.

FIG. 2f is a side view of a round tube hand hold with a squared base according to one embodiment of the present invention, shown in the stowed position and installed in one embodiment of a hand hold pocket.

FIG. 2g is a side view of the hand hold and hand hold pocket of FIG. 2f, shown in the use position.

FIG. 2h is a cross-sectional view of the hand hold pocket of FIGS. 2f and 2g, taken along line C-C in FIGS. 2f and 2g.

FIG. 2i is a side view of another embodiment of a hand hold and hand hold pocket according to the present invention.

FIG. 2j is a cross-sectional view of the hand hold pocket of FIG. 2i, taken along line D-D in FIG. 2i.

FIG. 3a is an isometric view of the hand hold pocket of FIG. 2a.

FIG. 3b is an isometric view of the hand hold pocket of FIG. 2d.

FIG. 4d is a more detailed rear isometric view of the rear cargo area of a semi-trailer, showing another preferred embodiment of an auxiliary step and hand hold system of the present invention, with the rotating-retractable step in the use position.

FIG. 5c is an enlarged view of the hinge joint of the hinged inboard rotating-retractable step of FIG. 5a.

FIG. 6c is an enlarged view of the hinge joint of the hinged outboard rotating-retractable step of FIG. 6a.

FIG. 9a is a top plan view of a stamping blank prepared to make a hand hold pocket according to one embodiment of the invention.

FIG. 9c is a side elevational view of the hand hold pocket shown in FIG. 9a, after having been formed, taken rotated 90 degrees from the view shown in FIG. 9b.

DETAILED DESCRIPTION OF THE PREFERRED EMBODIMENTS

Figure 1A:
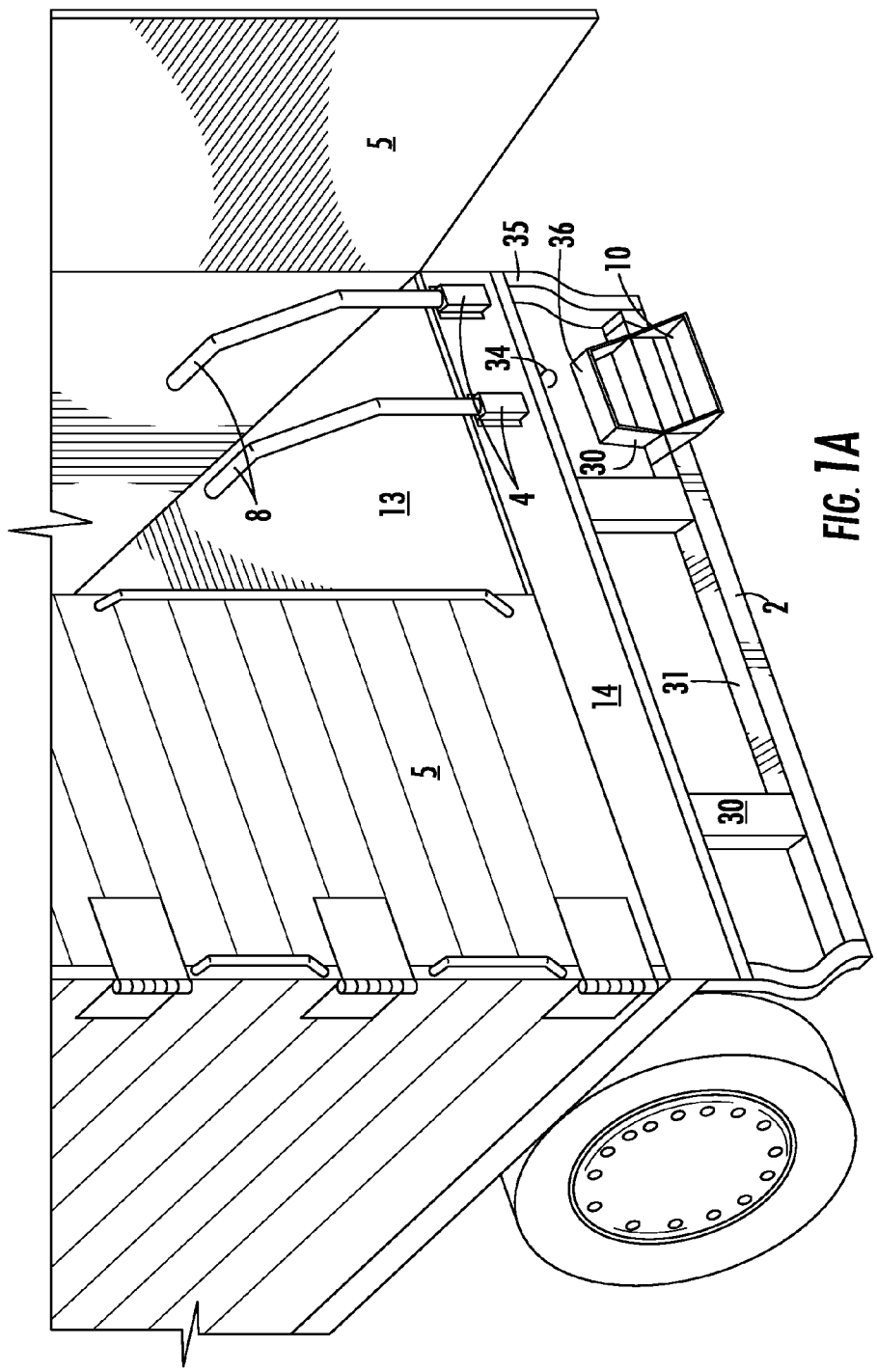
FIG. 1a is a partial rear isometric view of the rear cargo area of a semi-trailer, showing one embodiment of an auxiliary step and hand hold system in accordance with the present invention, with the rotating-retractable steps and hand holds shown in their use positions.

Referring to FIGS. 1a-1e, the present invention provides an auxiliary step and hand hold system that includes rotating-retractable steps 10, 11, 12, 28, optional stationary steps 32, 36, 39 and two forward-extending hand holds 8. The rotating-retractable steps can be mounted below a trailer's under-ride-guard (or ICC) beam 2, to ease the climb onto the cargo floor 13. After use, the rotating-retractable steps 10, 11, 12, 28 swing up and forward for stowage, to a latch 34 (explained in more detail below) above the beam 2, and forward of its aft face, where the step is protected from impact. The hand holds 8 move from a stowed position 20 to a use position 8 and back to the stowed position 20 in a matter of seconds.

Figure 1B:
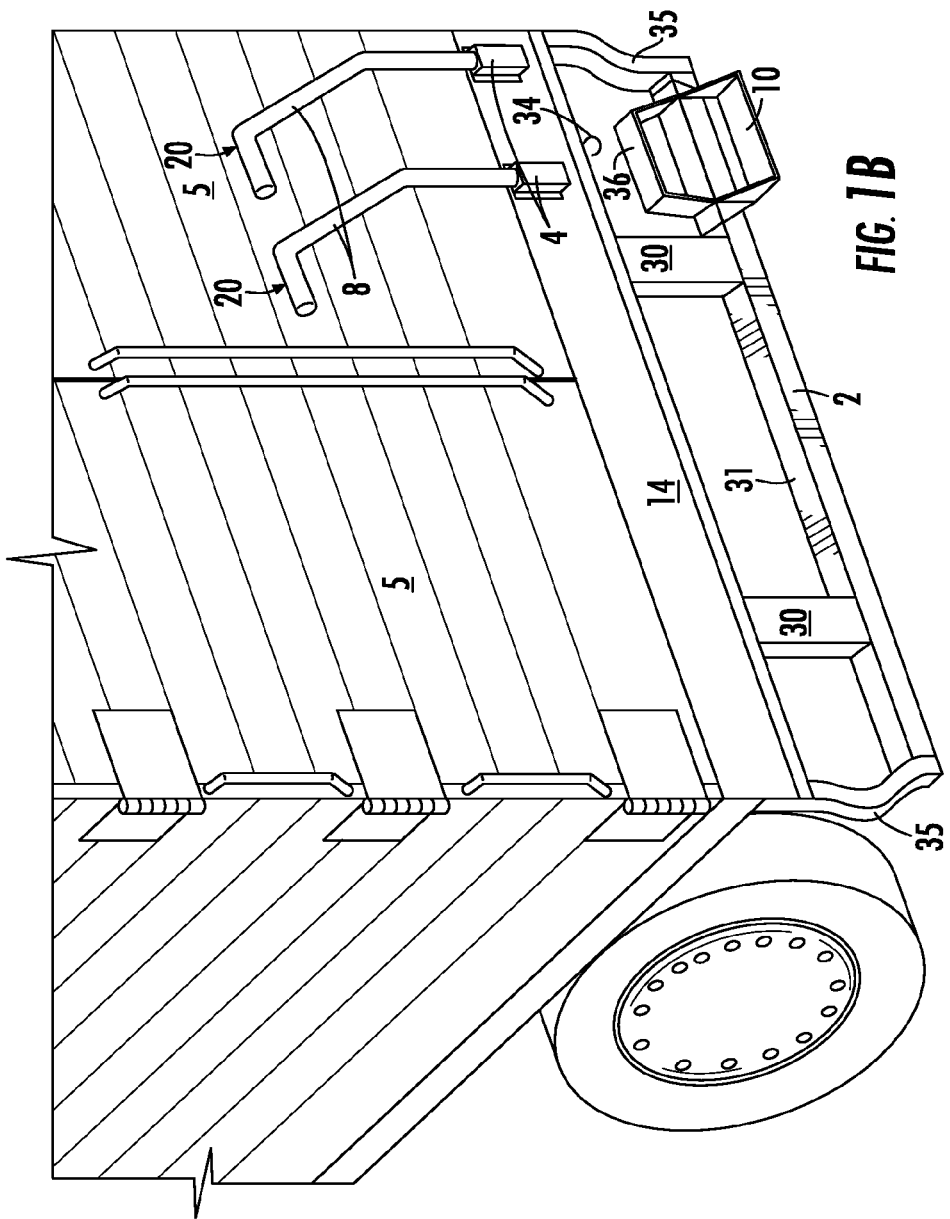
FIG. 1b is a partial rear isometric view of the rear cargo area of a semi-trailer, showing the auxiliary step and hand hold system of FIG. 1a, with the hand holds shown in preferred stowed positions.
Figure 1C:
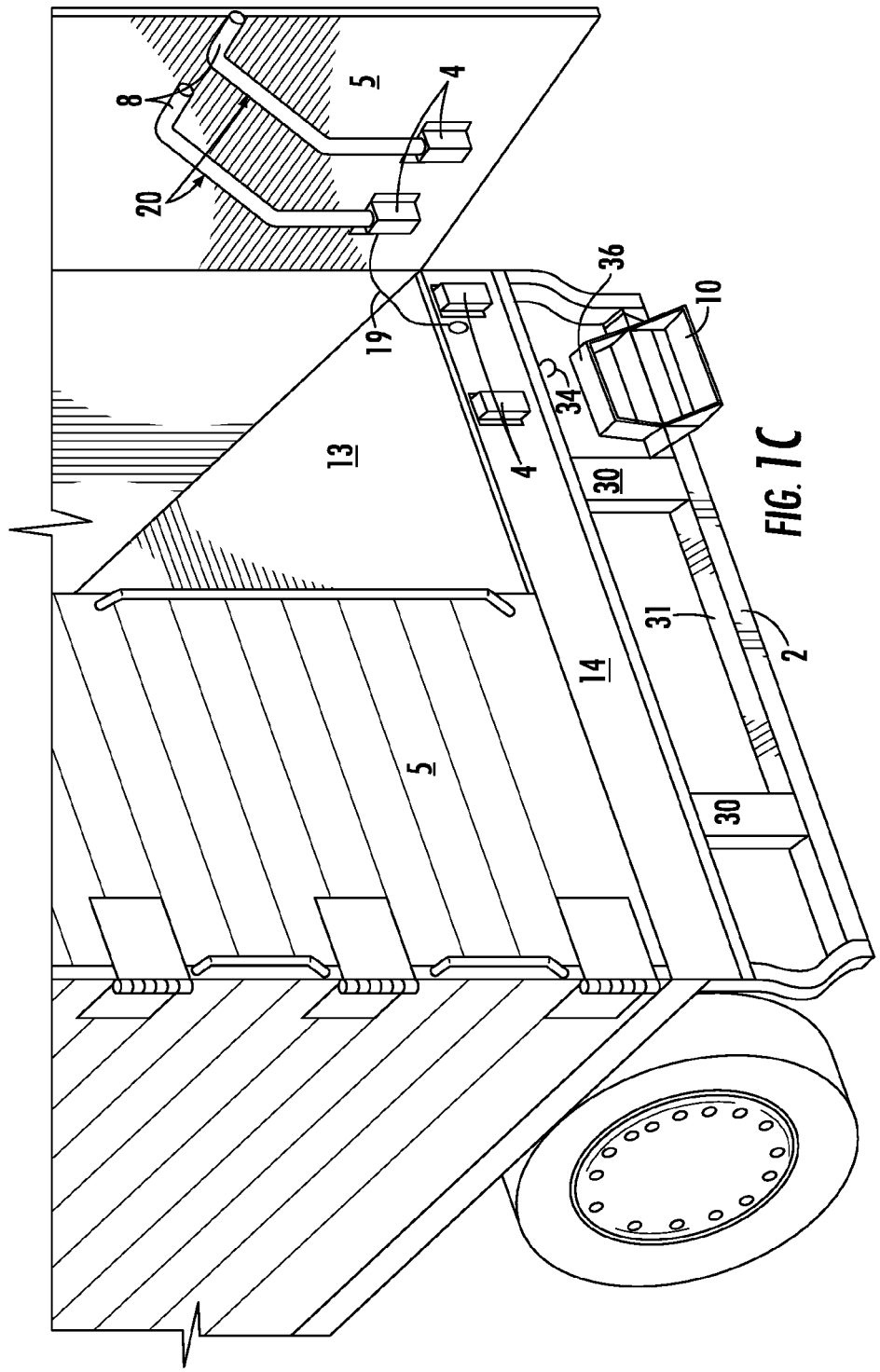
FIG. 1c is a partial rear isometric view of the rear cargo area of a semi-trailer, showing the auxiliary step and hand hold system of FIG. 1b, with the hand holds shown in another preferred stowed position.

FIGS. 1a-1e illustrate several possible embodiments of the auxiliary step and hand hold system of the present invention. FIG. 1a shows the use of a rotating-retractable step 10, a stationary step 36, two pockets 4, and two hand holds 8. The step 10 and the hand holds 8 are shown in their use positions. Step 10 is an outboard, pivoted rotating-retractable step as described in more detail in later paragraphs. FIG. 1b shows the same embodiment as FIG. 1a, but with the hand holds 8 in the stowed position 20. To stow the hand holds 8, they are lifted out of the pockets 4, rotated 90 degrees, and placed back in the pockets 4. In the stowed position 20, the hand holds 8 are flush with the outer surface of the trailer door 5 (when the door is closed). To stow the step 10, it is rotated in the direction of the arrow and secured with latch 34. FIG. 1c shows an alternate stowage option for the embodiment of FIG. 1a, wherein two additional pockets 4 are mounted on the inner surface of the trailer door 5 to receive the hand holds 8 in the stowed position 20.

Figure 1D:
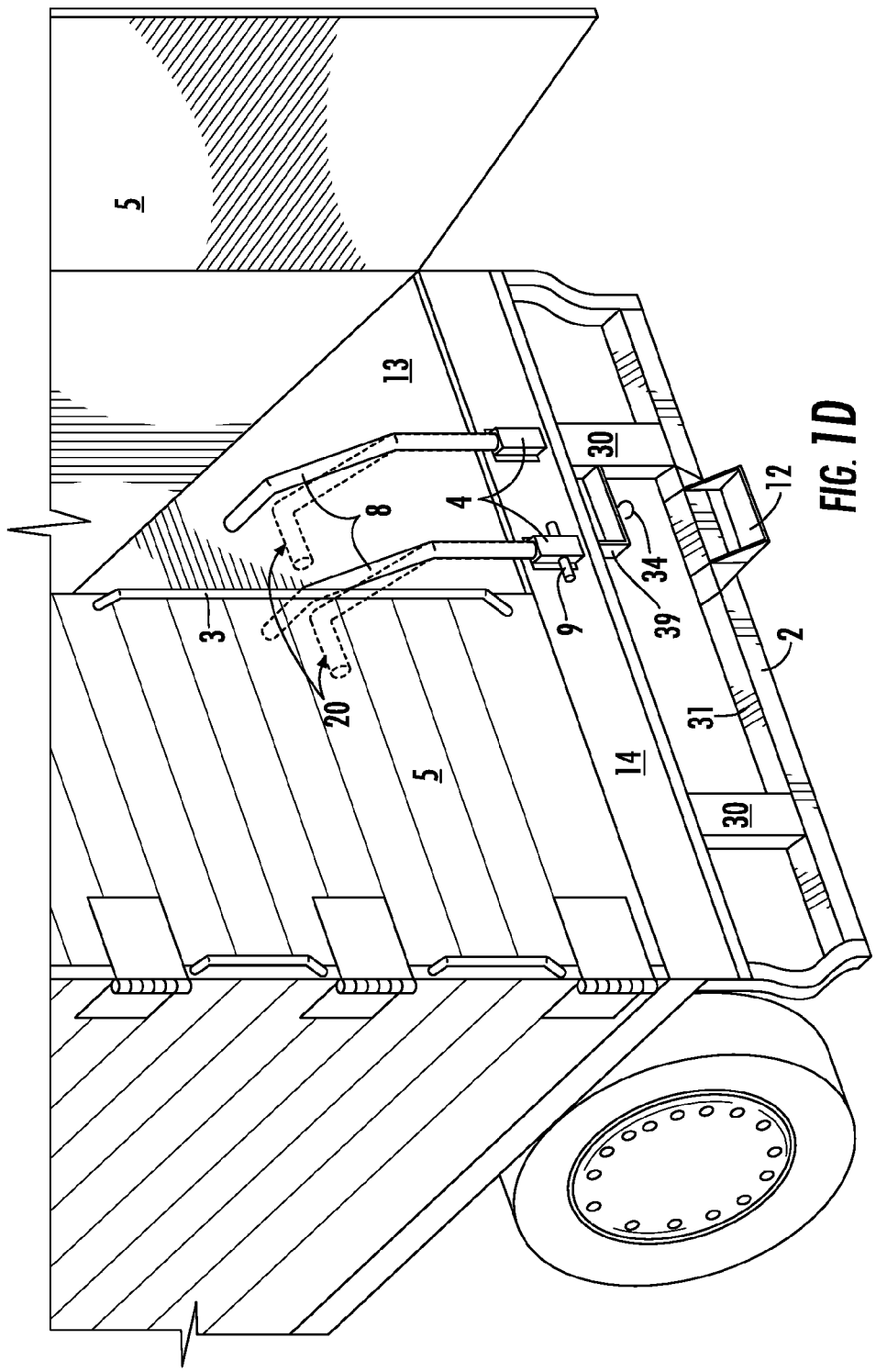
FIG. 1d is a partial rear isometric view of the rear cargo area of a semi-trailer, showing another embodiment of an auxiliary step and hand hold system in accordance with the present invention, with a preferred stowed position of the hand holds shown in phantom.
Figure 1E:
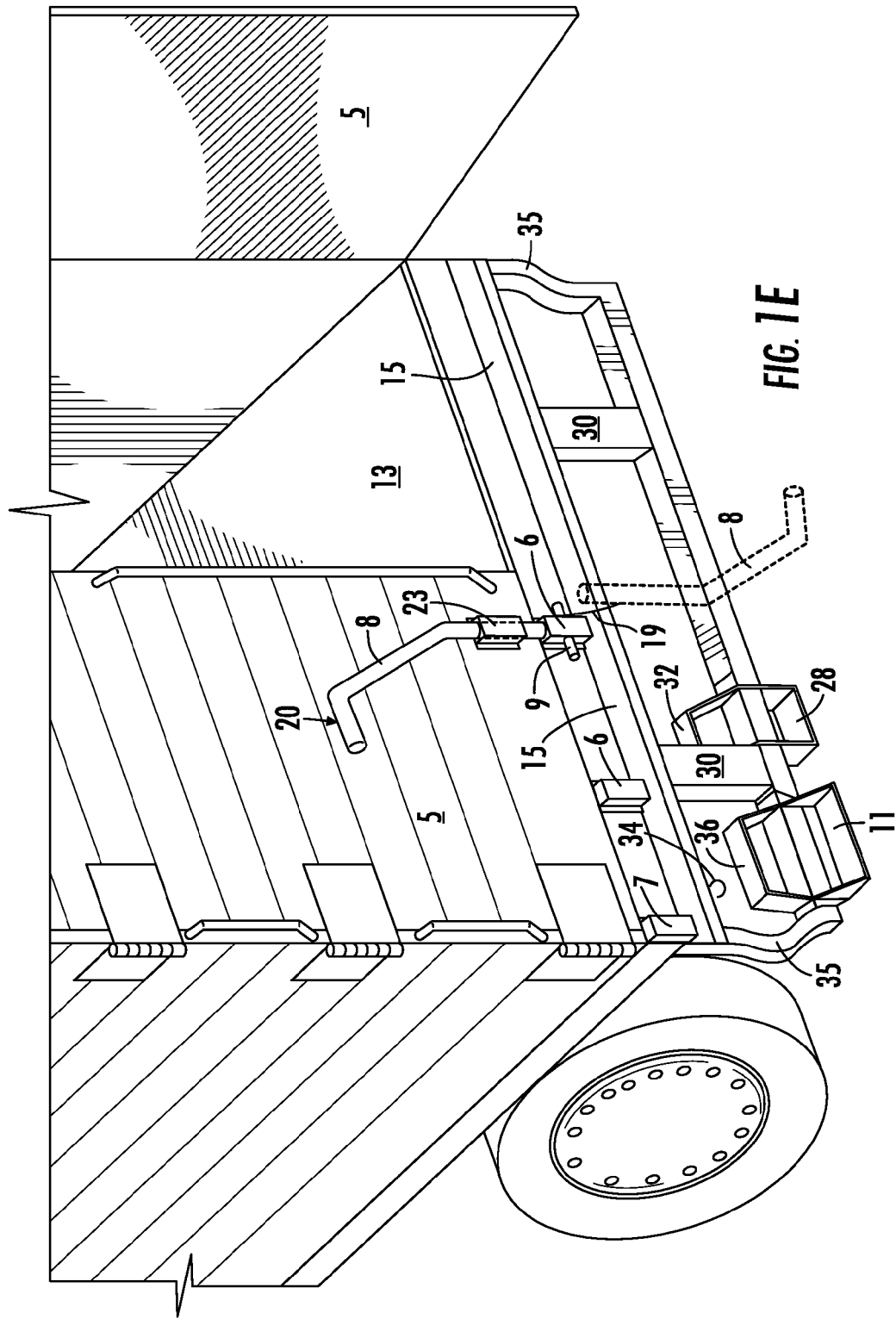
FIG. 1e is a partial rear isometric view of the rear cargo area of a semi-trailer, showing other possible mounting positions for the rotating-retractable steps, stationary steps and hand hold pockets, and other possible stowed positions for the hand holds.

FIG. 1d shows another embodiment of the auxiliary step and hand hold system of the present invention. The embodiment of FIG. 1d includes an outboard, hinged step 12 used in connection with a stationary step 39. The hand holds 8 are shown in the use position in pockets 4. Shown in phantom are the hand holds 8 rotated 90 degrees about their vertical axes, which constitutes the stowed position of the hand holds. One of the pockets 4 includes a locking mechanism 9, as further described in later paragraphs. Step 12 and the hand holds 8 are stowed in the same manner as described for step 10 and the hand holds 8 of FIG. 1a. FIG. 1e shows additional embodiments of the auxiliary step and hand hold system. Step 11 is an inboard, pivoted rotating-retractable step, and step 28 is an inboard, hinged rotating-retractable step. Stationary steps 32, 36 are also shown, along with alternate pockets 6, 7. An additional pocket 23 can also be used for various purposes, as described in detail in later paragraphs. For security and theft avoidance purposes, the hand holds 8 may be secured to the trailer using a tether or cable 19, and can be suspended by the cable 19 as shown in phantom.

Referring to FIGS. 1a-1e, 4a-4f, 5a-5c and 6a-6c, the "hinged" versions 12, 28 of the rotating-retractable steps are a modified version of the basic step shapes described in Ruehl's other pending patent application, U.S. application Ser. No. 11/554,885, the disclosure of which is incorporated herein by reference for all purposes. Like the basic steps, the rotating-retractable steps have a horizontal step member 48 with an upwardly facing stepping surface, a pair of side supports or legs 43, and mounting tabs 44.

The hinged rotating-retractable steps 12, 28 differ from the basic step shapes previously disclosed in that a hinged pin 42 is placed at the intersection of the steps' left and right vertical support legs 43 and their respective "universal" mounting tabs 44—the hinge replacing the simple right angle bends at this junction in Applicant's co-pending patent application. The pin retainers 50 may be curled into the existing leg 43 and mounting tab 44. The leg curl might be done in the flat blank, before the stamping or press-break forming. This approach maintains the high material utilization of those earlier designs, and their simple mounting, and adds only the weight of the pin 42 and the cost of assembling the pins 42 into the pin retainers 50. Of course, for a lower production volume a separate hinge 51 could be welded on the step; however, at higher rates of production, weld-on hinges would likely incur a slight cost and weight penalty.

A derivative of the hinged approach is a spring-loaded hinge, similar to those on some self-closing doors, which might be dragged by the boot into usage position, and then, after use, self-retract into stowage position as the boot is lifted.

Figure 4A:
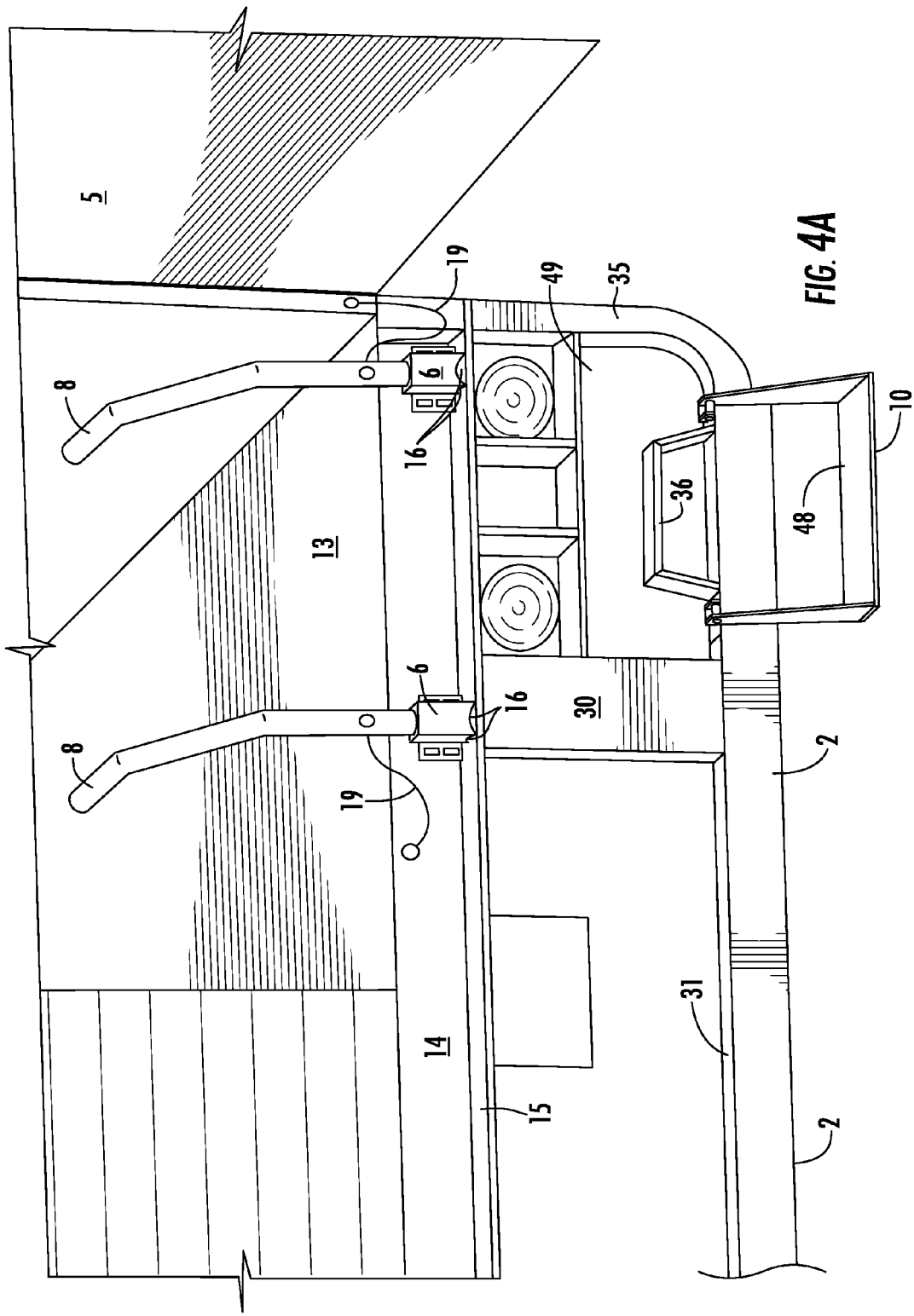
FIG. 4a is a more detailed rear isometric view of the rear cargo area of a semi-trailer, showing one preferred embodiment of an auxiliary step and hand hold system of the present invention, with the rotating-retractable step in the use position.
Figure 4B:
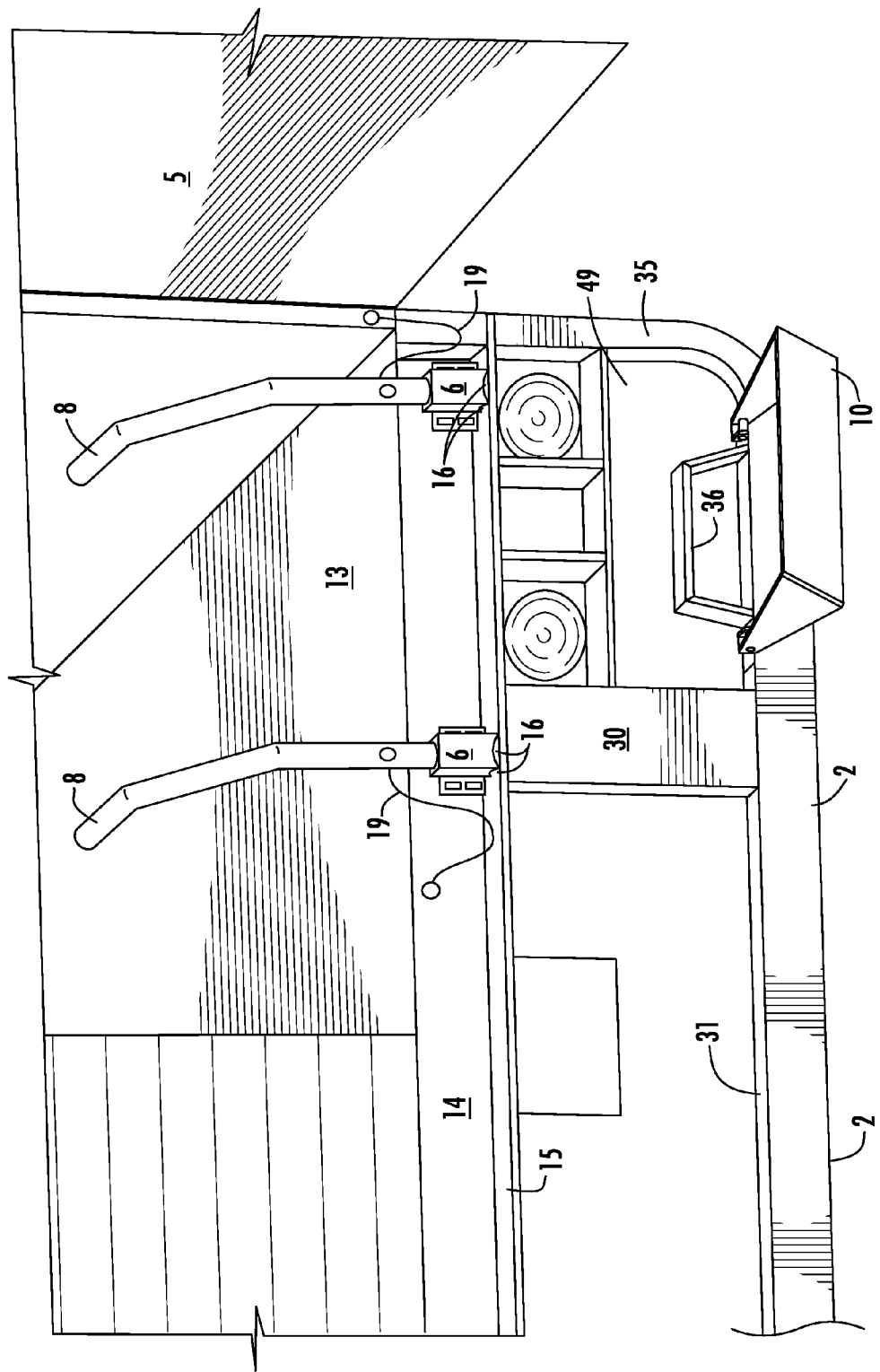
FIG. 4b is a more detailed rear isometric view of the rear cargo area of a semi-trailer, showing one preferred embodiment of an auxiliary step and hand hold system of the present invention, with the rotating-retractable step in transition between the use position and the stowed position.
Figure 4C:
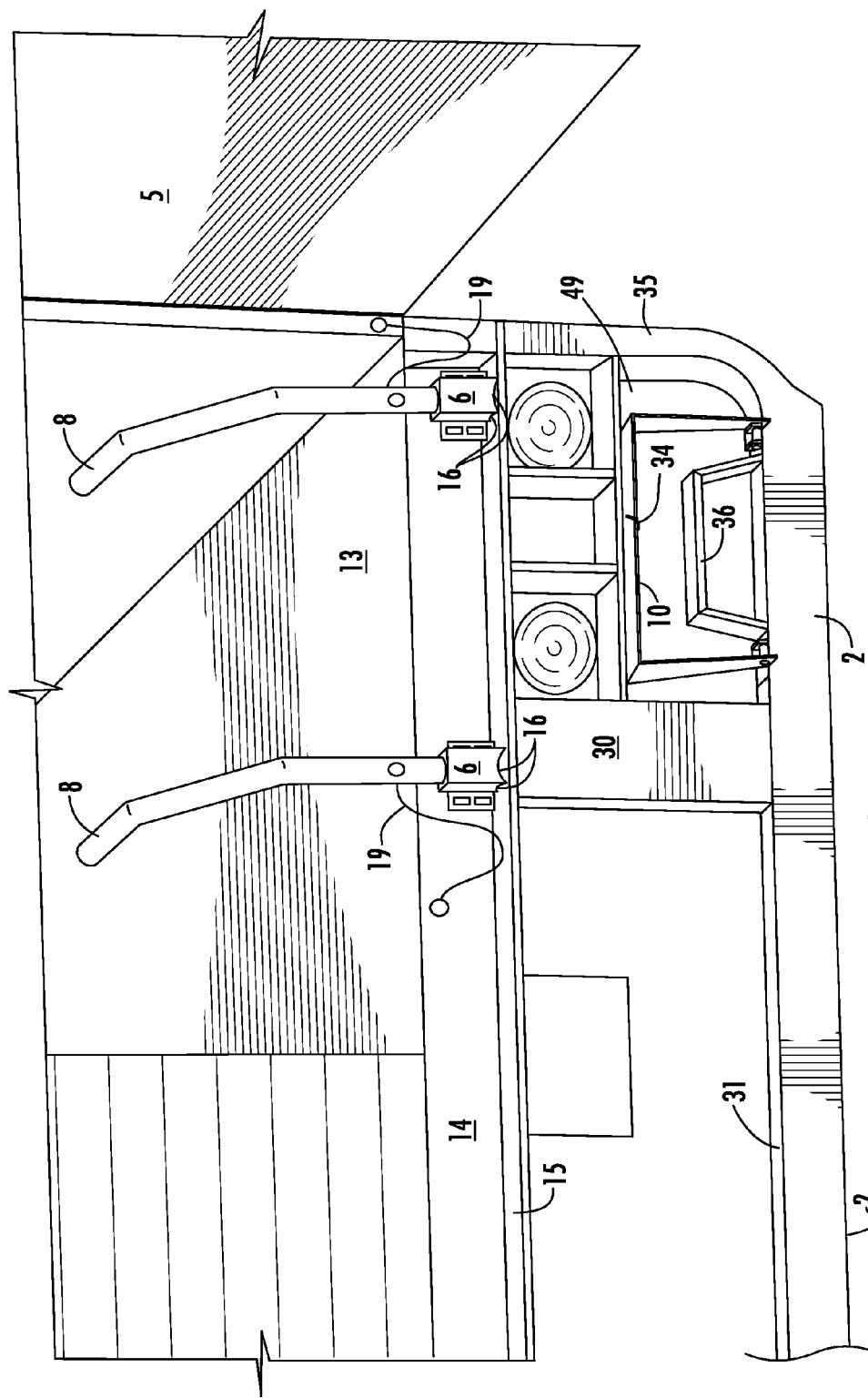
FIG. 4c is a more detailed rear isometric view of the rear cargo area of a semi-trailer, showing one preferred embodiment of an auxiliary step and hand hold system of the present invention, with the rotating-retractable step in the stowed position.
Figure 4E:
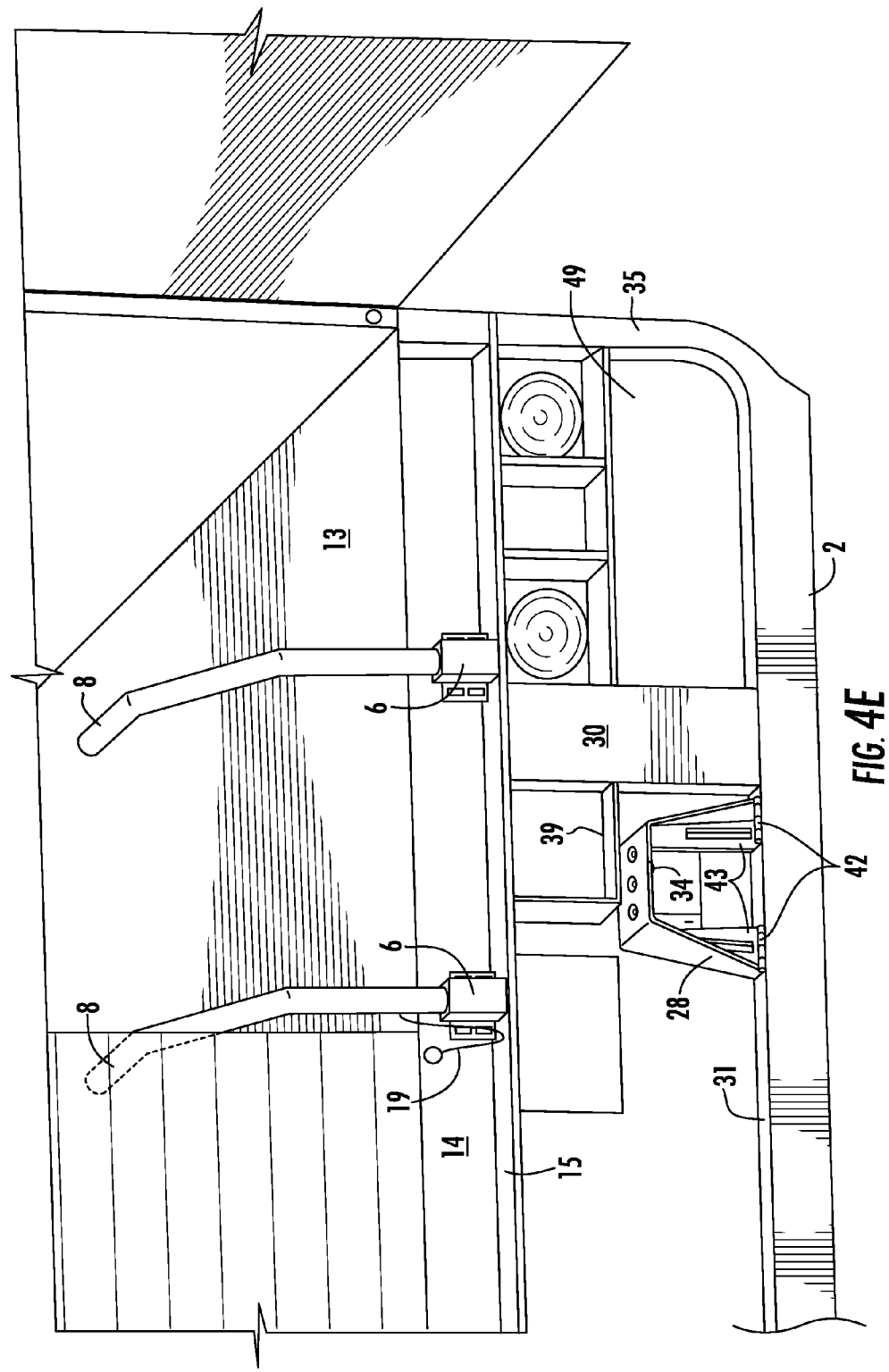
FIG. 4e is a more detailed rear isometric view of the rear cargo area of a semi-trailer, showing another preferred embodiment of an auxiliary step and hand hold system of the present invention, with the rotating-retractable step in the stowed position.
Figure 5A:
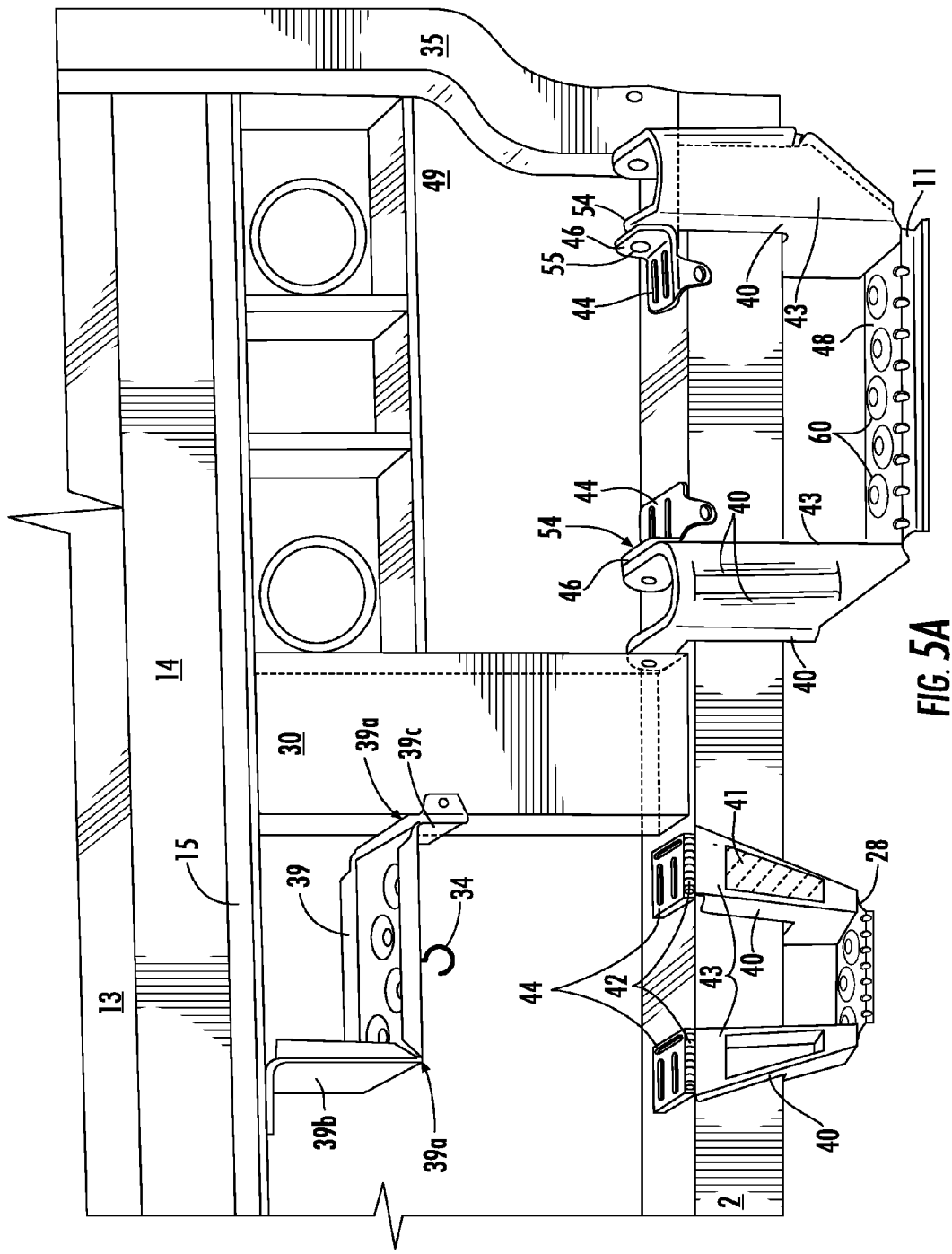
FIG. 5a is an isometric view of the hinged and pivoted versions of the inboard rotating-retractable step, as mounted below a semi-trailer under-ride guard (ICC) beam using the vertical and side supports of the ICC beam.
Figure 5B:
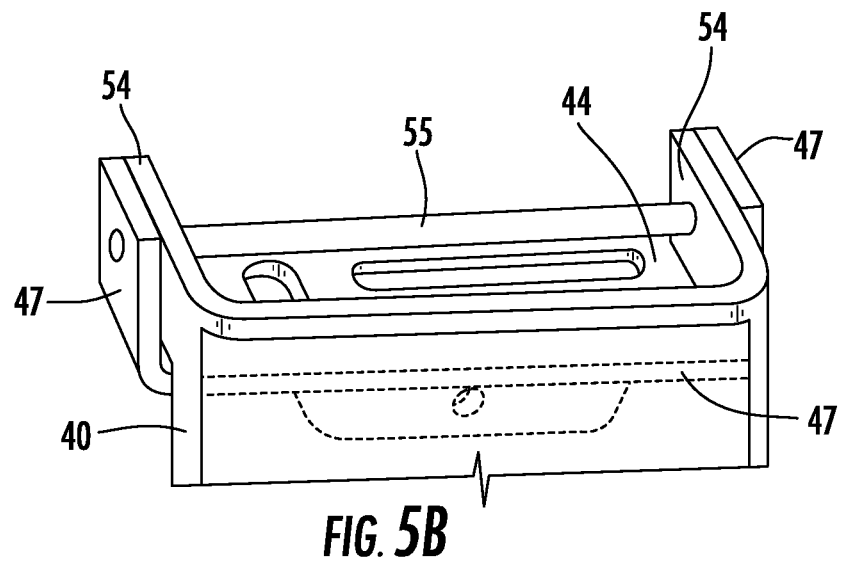
FIG. 5b is an enlarged view of the pivot joint of a pivoted inboard rotating-retractable step, as mounted in a stand-alone position without the use of the ICC beam vertical and side supports.
Figure 5C:
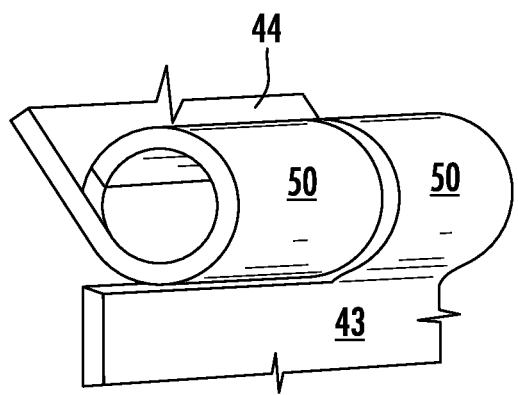
Figure 6A:
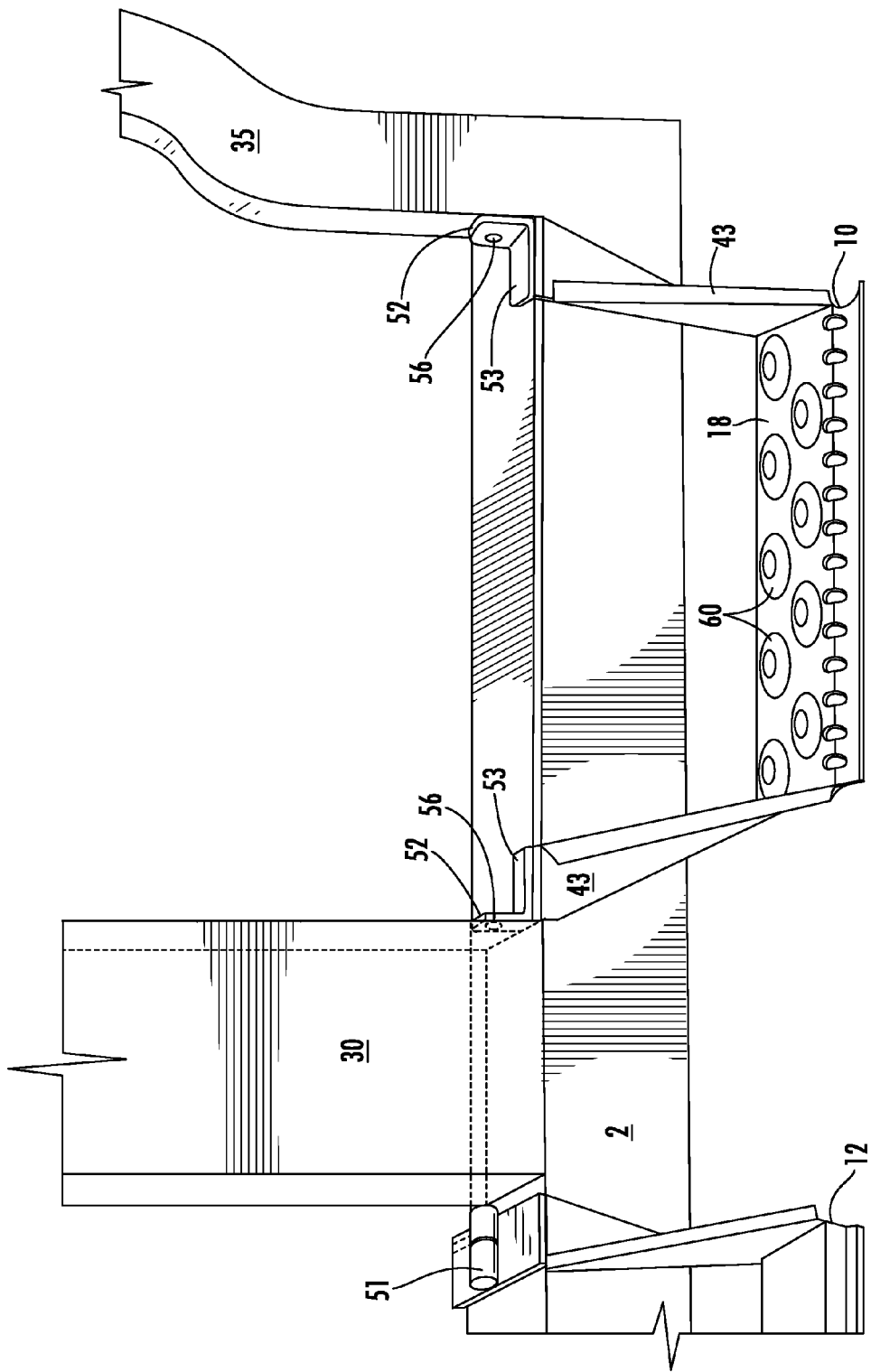
FIG. 6a is an isometric view of the hinged and pivoted versions of the outboard rotating-retractable step, as mounted below a semi-trailer ICC beam using the vertical and side supports of the ICC beam.
Figure 6B:
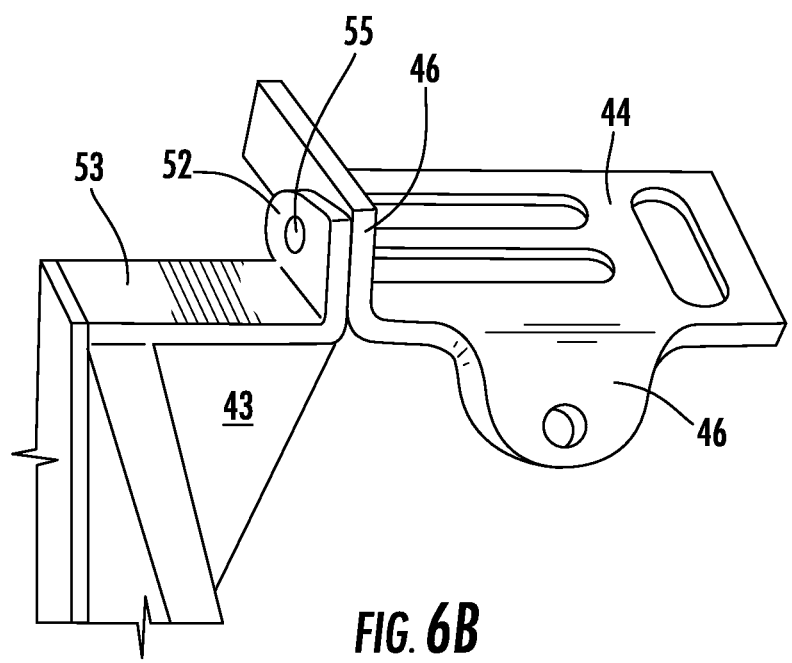
FIG. 6b is an enlarged view of the pivot joint of a pivoted outboard rotating-retractable step, as mounted in a stand alone position without use of the ICC beam vertical and side supports.
Figure 6C:
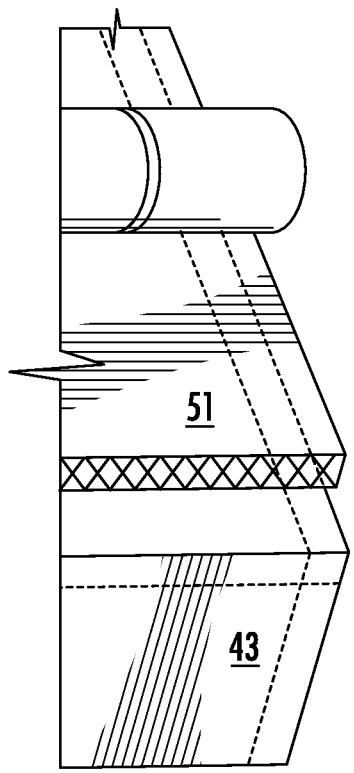
Figure 7:
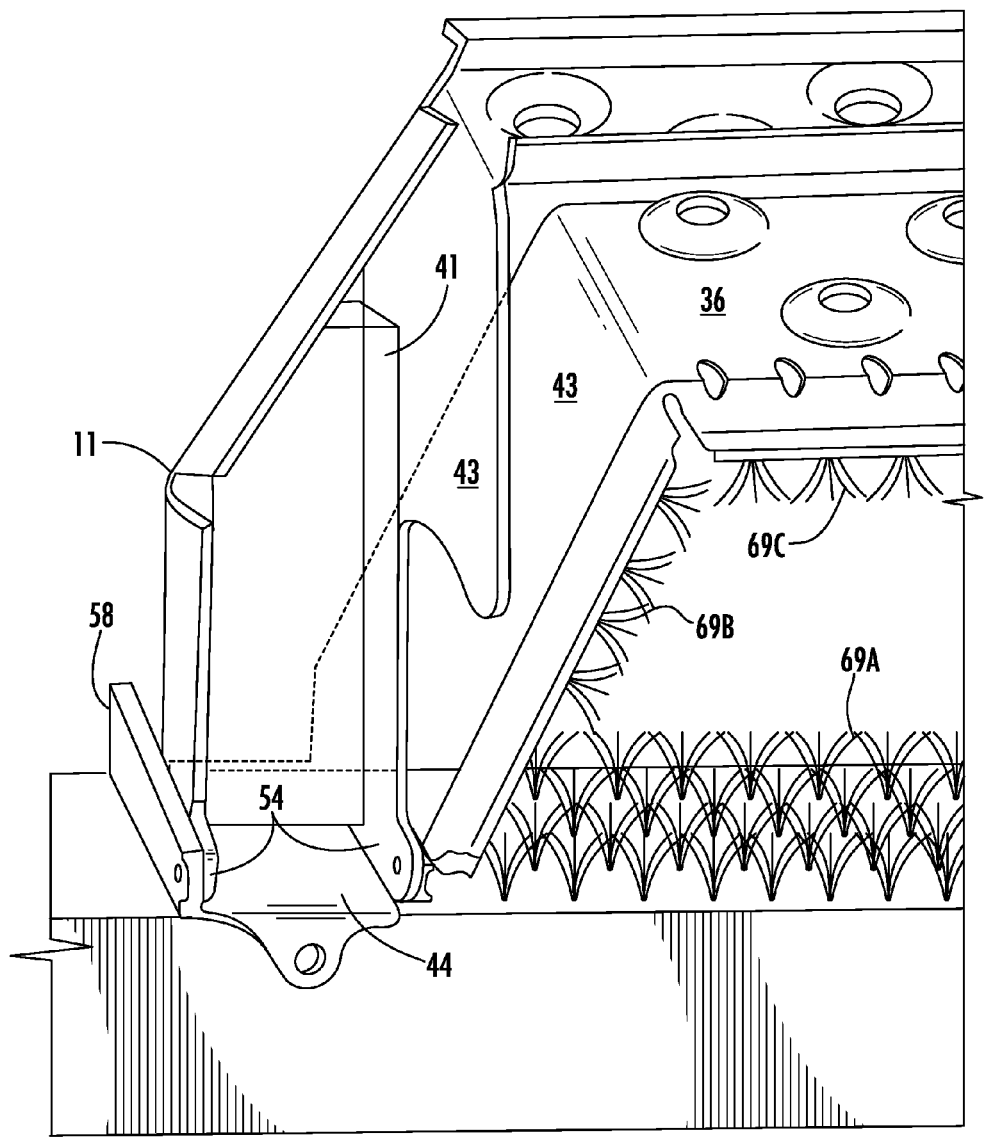
FIG. 7 is a partial isometric view of a rotating-retractable step of the present invention, shown in the stowed position and mounted in connection with a stationary step.

Referring to FIGS. 1*a*-1*e*, 4*a*-4*f*, 5*a*-5*c*, 6*a*-6*c* and 7, the "pivoting" versions 10, 11 of the rotating-retractable steps, are similar to the "hinged" versions, except that instead of hinging the mounting tabs 44, pivot joints 52 are used to facilitate the rotation/retraction of the steps. A small, secondary, vertical pivot tab 53, 54 is turned up from the lateral outer ends (53) of the existing mounting tabs 44 as shown on the step 10, or extended forward (54) from the flanges 40 on the vertical legs 43 as shown on the step 11. Through these pivot joints 52, a pivot bolt 55 or a large (5/16"-3/8") self-drill/tap drive screw 56 passes (with appropriate washers), to anchor and pivot the step 10, 11 against the sidewall of the vertical supports 30, 35 on the ICC beam 2, and/or in a stand alone position against a simple "L" 46 or "U" 47 bracket, added for this purpose. FIG. 5*a* shows the step 11 mounted in connection with vertical supports 30, 35 on the outside of legs 43 and in connection with an "L" bracket 46 on the inside of legs 43. FIG. 5*b* shows the use of a "U" bracket 47 in connection with a step 11 mounted in a stand alone position. FIG. 6*a* shows step 10 mounted in connection with the vertical supports 30, 35 on the outside of legs 43, where no "L" bracket 46 or "U" bracket 47 is needed. FIG. 6*b* shows an "L" bracket 46 used in connection with a step 10 mounted in a stand alone position. FIG. 7 shows a step 11 mounted in connection with a stationary step 36, using common mounting tabs 44. With any of the pivoted steps described, there is no load on the step 10, 11 when pivoting. Thus, the only force on the pivot bolt 55 or drive screw 56 will be a virtually pure shear load when the step 10, 11 is used.

In some cases the ICC beam 2 has additional (smaller) vertical support beams 35 on its outboard ends. In this case, the width of the step member 48 of the step 10 can be adjusted so that either or both left and right pivot joints 52 anchor into the existing trailer structure without requiring an added "L" 46 or "U" 47 bracket as shown in FIGS. 5*a* and 6*a*; or the step 11 may only need an "L" bracket 46 instead of a "U" bracket 47. This would also provide a bigger step member 48 for the climber, which may prove helpful, especially during descent. Finally, referring to FIG. 7, the wider rotating-retractable steps 10, 11 are able to straddle a wide stationary step 36, which may also be used to pre-mount the rotating-retractable step 10, 11 as discussed below.

Both the hinged and pivoting designs extend only about four-to-six inches below the four inch deep ICC beam 2. That leaves a ground clearance of about 14"-to-16" (unlikely to hit ground), while providing a step surface about eight-to-ten inches below the current 24" first step (ICC beam top). Fourteen-to-sixteen inches is not a big riser when assisted by the pair of ergonomically-shaped, and placed, hand holds 8 with comfortable, non-slip gripping surfaces, that are shown here and described below. These rotating-retractable steps have the added advantage that if the operator forgets to stow the step after use, and if the step were to strike ground or an object during forward motion, the step is likely to merely swing back, and then up and forward, escaping damage.

Referring to FIG. 1*e*, because of the 14"-to-16" nominal ground clearance, and this step's low cost, a simple, stationary step may be a good choice for many applications at this location. The stationary step would be used instead of the rotating-retractable step 28. Without the need to rotate to stowage above its mounting, that space, above the ICC beam 2, can be used for the "tall" mounting of the very simple, inexpensive and robust stationary step 32. In that instance, those two stationary steps complete the partition of the two 24" risers, from ground to the trailer floor, into four smaller steps.

Referring again to FIGS. 1*a*-1*e*, 4*a*-4*f* and 5*a*-5*c*, with the rotating-retractable steps, that space immediately over the ICC beam 2 is claimed for rotated stowage of the rotating-retractable step 10, 11, 12, 28. On many trailers there is room above the stowed step 10, 11, 12, 28 for an inverted, horizontal "short" mounting of a stationary step 39. This is best achieved by slightly altering the concept in Ruehl's other pending patent application to square the bended joint 39*a* between its two (long and short) legs 39*b*, 39*c* as shown, which bend joint was slightly angled in the earlier-filed disclosures. This "squared" configuration works for both steps 32 and 39; mounted to the left or right side of the ICC beam vertical support 30; and suspended from the under-floor trailer structure, or ascending from atop the ICC beam. Due to this mounting flexibility, the "squared" version of the stationary step 32, 39 becomes its preferred embodiment.

Referring to FIGS. 4*a*-4*f* and 5*a*-5*c*, in some cases the trailer does not have sufficient space 49 over the rotating-retractable step 10, 11, 12, 28 for the suspended "short" mounting of the stationary step 39. In such cases, a wide rotating-retractable step 10, 11 can rotate over and straddle a stationary step 36 of similar but inverted shape and of slightly smaller size—specifically designed for this purpose. Referring to FIGS. 1*a*-1*e*, 4*a*-4*f* and 7, in this case, the rotating-retractable step 10, 11 could be pre-mounted to the stationary step 36. These two steps 10/11, 36 could be joined via the hinge or pivot attachments as shown. The rotating joint would then be made in the factory, under controlled conditions. The solid mounting of the stationary step 36 to the ICC beam would also mount the rotating-retractable step—resulting in an easier net installation.

The rotating-retractable steps have a stowage position that is forward and over the under-ride guard beam, and is thereby protected against impact from any direction. As referred to above, the rotating-retractable steps can also be stowed via latch 34, which could be a simple hook, clasp, chain and/or elastic strap, magnetic latch or the like, conveniently, at waist level, by the operator, with little effort or skill. FIG. 4*c* shows step 10 in its stowed position, FIG. 4*e* shows step 28 in its stowed position, and step 11 is shown in its stowed position in FIG. 7.

Two embodiments of auxiliary sheet-metal steps, described in Ruehl's earlier-filed pending patent application as the upper step and lower step embodiments, can be hinged or pivoted as described above. Because both step embodiments are used herein in the lower step position, the previously disclosed "lower" step embodiment will be referred to herein as the inboard embodiment and the "upper" step embodiment will be referred to herein as the outboard embodiment. Referring to FIGS. 1*a*-1*e*, 4*a*-4*f*, 5*a*-5*c* and 7, the inboard embodiment—the steps 11, 28—the step member 48 tucks inboard from the mounting surface, under the ICC beam, during use; and its aft surface is virtually flush with the aft face of that beam (to resist bending from a forward load, four quarter-inch flanges 40 are turned forward on each leg, or two flanges and a solid ¼" metal-to-metal spacer plate 41—slightly off-setting it from the aft face of the beam). The inboard embodiment has the added advantage that if the driver forgets to stow it, and if it backs into a vertical, flat plane (such as a wall), that also engages the full ICC beam; there is less risk of damaging the step.

Referring to FIGS. 1*a*-1*e*, 4*a*-4*f* and 6*a*-6*c*, on the outboard embodiment of rotating-retractable step 10, 12, the footpad extends outboard (aft) of the ICC beam 2, by about five inches (seven inches behind the aft edge of the cargo floor 13). Importantly, in this instance, the stepping surface is more nearly directly under the CG of the climber, reducing the cantilevered moment that is otherwise tipping him backward. There is also more space for a large belly—an occupational hazard among truckers, who may sit behind the wheel up to eleven hours a day, stopping only for food, fuel and sleep. For some, this aft off-set of the outboard step may be a significant access and/or safety advantage. During ascent, with the trailer floor four feet above the ground, a driver with a big belly physically cannot place his CG over a conventional under-slung ICC beam 2 first step, at 24" up from ground—the floor 13 gets in the way. The result is a backward-tipping lean. His belly may also obscure his view of the step, making foot placement "blind," especially during descent.

By contrast, during ascent using the outboard step 10, 12, the first step lifts the climber only 14-16" above ground—an easier climb, especially with the step's 7" rear off-set from the edge of the floor. The cargo floor 13 is then only 32" above the climber's stance. As he or she takes the second step, to the massive and easy-to-locate ICC beam, the climber's feet rise to a platform only 24" below that floor. Combined with the forward leaning hand holds 8, the climber's CG will be brought forward, over the floor edge and into the cargo bay. The next two steps progressively move the climber up and forward—the top end of the hand hold 8 being 14" forward of the edge-of-floor, and 27" above its surface.

The trade-off with the outboard step is that if the driver forgets to stow this step, and backs-up against any solid object, it will certainly be crushed against the ICC beam. With either embodiment rotating-retractable step, a contact switch with a caution light in the truck's cab (not unlike a "door-ajar" light—and perhaps using common parts from that high-volume application) could alert the driver that the step has not been properly stowed. However, with such an inexpensive step, the warning might cost more than a replacement. Nonetheless, if such damage became an annoyance to a fleet, this warning-light solution would likely be affordable, if integrated into replacement truck and trailer OEM purchases, as a factory option. A spring-loaded hinge option offers yet another way to avoid step damage—a self-stowing step that returns to stowed position when foot pressure is removed. However, trade-offs of cost, complexity and of corrosion of the light spring wire may make the simple, unsprung rotating-retractable steps the better choice.

The same rotating-retractable and stationary auxiliary steps may be used at the existing lower cab step, or at other medium and heavy truck sites (sleeper cab, 5th-wheel catwalk), or in other vocations (e.g. farming, mining, military, emergency, construction, earth-moving, or utility equipment), where nominally high, but irregular, ground clearance makes a rotating-retractable step attractive; or where the features of the stationary, reversible steps (mounting above and below many structures as an individual step, or mounting a rotating step), may be an advantage. The same stationary step, without the rotating-retractable step attachment, and without pivot tabs, can be similarly mounted to function independently, extending either above or below most horizontal structural surfaces, such as atop or below the ICC beam, as herein described, or to other horizontal structure in other vehicle areas (such as to the cab steps, or to existing steps at the "sleeper" cab, or at the 5th-wheel "catwalk") as described in our co-pending patent applications.

Referring to FIGS. 1-1*e*, and 2-2*j*, the present invention includes two forward-extending hand holds 8 that can be moved from a stowed position 20 to a use position 8 and back to the stowed position 20 in a matter of seconds. This contrasts with existing one-hand-only, stationary options that are rarely chosen, or used, and must mount behind the rear edge of the cargo bay, and outside of the 51" RH door opening, either on the RH edge 1 of the cargo box, or along the center edge 3 of the LH door. Instead, the present invention can be installed as a LH and RH pair anywhere in the opening, and optimally positioned and spaced for use with the selected auxiliary steps, for the most comfortable load distribution between the climber's four limbs. They are shaped to transfer the CG of the climber from a starting position below and behind the cargo bay, to a final position well into the cargo space—and safely forward of the rear edge of the cargo floor. With the proposed invention, as each limb is sequentially released and raised in the course of the climb, the "three-points-of-contact" are continuously maintained by the other limbs—unlike the current three-point systems that during climb drop to two points, about which one can pivot out-of-control—or worse, the majority, with no hand holds at all. This invention permits an erect climb for most, while the incline of the preferred hand hold results in a final hand position 14" forward of the rear floor-edge, and 27" above the floor—inducing a slight forward lean. If a foot did slip during the climb, with a firm, two-handed grip on the continuous, non-slip rails, and the slight forward lean, the climber is likely to fall to his feet, rather than his backside. This contrasts with existing hand holds that extend aft of that rear-edge-of-floor, inducing a backward lean when standing atop of the ICC beam (feet extending forward of that edge), and, thus, risking a backwards fall, as described above, often onto hard pavement below.

The hand holds 8 are installed in pockets 4, 6, 7. Referring to FIGS. 1, 2*a*-2*j*, 3*a*-3*b*, and 9*a*-9*c*, three versions of a simple, one-piece 1½"×1½" ID square pocket are shown in detail as a matter of illustration of preferred embodiments of the invention: pocket 4 with a hat-section 105 and a formed bottom 106; pocket 6 with a hat-section 105 with an open bottom 107; and pocket 7, which is a simple square tube. Each pocket 4, 6, 7 can have a flares 37 formed at the top opening thereof to readily receive any square or round hand hold 8 with a 1½" OD. Each pocket 4, 6, 7 can be welded in place on the vertical surface, just below the aft edge of the trailer floor. The two hat-section 105 versions 4, 6 can also be secured to that surface with bolts (carriage bolts, for one-side tightening—or standard bolts), or with self-drill/tap screws through their "hat-brim" flanges 110. All three pockets 4, 6, 7 offer bottom support for the hand hold base—the open bottom versions 6, 7 by sitting on an existing short trailer ledge at this point. All three offer good drainage of snow, mud, ice, rain, salt, and stones—through large drainage holes 16 at the base of the sidewalls on the open bottom pockets 6, 7, and through the partially-open design of the formed-bottom pocket 4. All three are protected from rear impact damage by the steel ledge and by the under-ride guard beam 2 and other rear trailer structure, which extend about 2" aft of the aft edge of the floor. All three preferably have a hole 115 centered in each sidewall through which one may pass an anti-rotational pin or bolt, or a padlock bar, which also may deter theft of the hand hold 8, and prevent unauthorized opening of the trailer door. This latter function requires that the same pocket is employed for both use and stowage of the hand hold 8 (with the hand hold rotated 90 degrees). For this anti-rotational and anti-theft function, four holes must be added to the hand hold 8, in line with the matching holes in the pocket, and 90 degrees to each other. To use this anti-theft/rail-stowage approach, the pocket must stand off from its floor-edge vertical mounting face by at least the thickness of the rubber door seal (for the hand hold to clear the seal). Ample spacing is provided naturally by the forward wall of the square tube version of the pocket. Hat-section pockets 4, 6 preferably include a spacer plate 25.

The pockets 4, 6, 7 can mount just below a trailer's rear door to securely anchor any 1½" round or square hand hold 8. This mounting provides a solid three or four-point-contact when climbing into a trailer. The pockets 4, 6, 7 can also be mounted to the inside of the trailer door for easy and convenient stowage, or on the outside of the trailer door if desired. Two pockets 4, 6, 7 mounted about two feet apart would provide left and right hand grips. They also fit along the sides of a flat bed, or on the truck frame siderail at the fifth wheel platform.

In most trailers, the flat vertical surface 14 immediately below the aft end of the trailer floor descends a short distance (3" to 10") to a horizontal, aft-facing ledge 15 that is about 2" wide. In some cases there is only space for a shorter, open-bottom pocket 6, 7. Heavier stock is recommended for the pockets 6, 7 to resist the functional loading over a now-shorter, vertical span. Deleting the formed bottom allows maximum use of the available height for leverage, while also saving an operation and a little material and weight, and slightly improving blank nesting. The heavier stock will also better resist dock impact, without deforming. The 2" ledge should prevent any contact with the pocket from rear impact. However, some operators would prefer that the pocket be strong enough to stop the dock bump by itself, without relying on the shelf or other structure, and without deforming. The resulting pocket 6 might look quite similar to the hat-section pocket 4, but with the above-noted changes. Or it might simply be a short section of heavy-wall square tube with the noted 1½" ID shown as pocket 7. The higher cost for the tube can be off-set by the simple cut-off processing. The pocket 7 can retain the small top flare 37 to ease insertion of the hand hold. It would be preferably welded 38 in place.

Any 1½" square or round tube can serve as a hand hold in accordance with the present invention. For example, the very common and inexpensive 1¼" ID thin-wall electrical conduit, or a standard wood 2×2 (1½" actual—hardwood recommended) could be used to form the hand holds 8.

Referring to FIGS. 2a-2j, the two bends 26, 27, in the hand hold—roughly 30 degrees at 17", and 60 degrees at 34", or equivalent curves—help transfer the climber's center-of-gravity (CG) upward and forward through the course of the climb. The recommended step embodiments extend about five inches aft of the ICC beam 2, and seven inches from the aft edge of the trailer floor—thus giving increased body clearance, and allowing the climber to stand more erect. Together with the hand holds, they allow even one with a large belly to ascend more vertically to the first recommended step, at about 16". Now as he ascends to the ICC beam top stepping surface 31 (second step at 24"), the trailer floor will be only 24" above his feet. At this point his belly can extend over the edge of the floor—not forcing him to lean backward. The third step, at 31" will take his CG further forward into the cargo bay as his hands follow the inclined hand hold up and forward. The end of the hand hold is about 14" forward of the aft floor-edge, and about 27" above the floor (about 3" lower than a standard dinning table). This will leave the climber standing safely forward of the floor-edge and leaning slightly forward into the cargo bay, with hand holds to steady him. On descent this CG transfer is reversed, from a starting position safely forward of the edge, and backing down, with the aid of the two hand holds. The geometry, principle and reasons for the hand hold's shape are roughly the same as for the hand holds on a swimming pool ladder. This contrasts with current practice, where any hand hold extends aft of the floor-edge; and the climber steps directly onto the ICC beam, which, itself, lies directly under that floor edge. The floor, in-turn, becomes a four-foot barrier to the passage of a large belly—tending to push the climber's CG aft of his feet, and risking a backward fall. In the absence of two well-placed hand holds, with which to resist that tip, he or she must try to force their upper body over the edge, onto the floor, and to crawl or roll forward into the cargo bay. This is sometimes called the "step and kneel" maneuver—but for some it is more of a "crawl and roll."

Referring again to FIGS. 2a-2j, by driving or pressing a steel wedge tool with a 1¼" square shaft into the base end of the 1¼" ID hand hold tube, the tube end 29 can be squared to create a second anti-rotational feature. This feature does not require a pin or bolt. Nor does it require any change to any other part or procedure. By choosing both squared base and 90 degree holes to resist handle rotation, one is free to use either feature, or to alternate between them—perhaps using the pin option only for an anti-theft padlock.

For extra security, a carriage bolt passing from left to right through respective holes in the sides of the pocket and of the hand hold, with a wing nut, would prevent unintended lifting during use, or any potential bouncing out of the stowage pocket when driving off-road or over deep potholes in pavement.

One particularly effective hand hold system of the present invention has the following preferred features. The hand hold 8, has steel walls about 0.100" thick, and is galvanized (or zinc-plated) on the outside, and has zinc-rich paint on the inside. It weighs about five pounds (each pound limits cargo capacity). As referred to briefly above, a tether or cable 19 could be optionally added—in function, not unlike a watch chain, or a key ring or wallet chain—a short (about 18") section of steel cable 19 would avoid the loss or misplacement, and would discourage theft of the hand hold. The cable 19 would be anchored with self-drill/tap screws, clinched fasteners, or the like—on one end to the hand hold, about 14" above its base, and on the other end to a solid point on the rear trailer. The actual length of the cable 19 and the choice of the anchor points will be set to ensure convenience of use, without interfering with hand hold gripping surfaces, nor crossing a stepping path (i.e. place the anchor to the left of the LH mount, and to the right of the RH mount). This would still permit easy placement of the hand hold in the inner door pocket for stowage, or it could be left to hang by the cable 19 while the doors are secured, and then returned to the functional pocket, but rotated 90 degrees to the stowed position 20, so that it lies flat against the outer door. To use this latter hand hold—stowage approach, the pocket should stand off from its floor-edge vertical mounting face by at least the thickness of the rubber door seal 24 (for the hand hold to clear the seal). This spacing is provided naturally by the forward wall on the square tube version of the pocket 7. Hat-section pockets 4 would require a spacer plate 25. Stowage in the functional pocket avoids the need for separate stowage pockets, but requires rail removal every time the cargo bay is opened—even at shipping docks—as might tethered door stowage. The inner door stowage also will infringe about 1½" into cargo space—which sometimes may be significant. Outer door stowage would be similar to inner door stowage, without the loss of cargo space, but perhaps requiring a padlock. The outer doors are about 2" forward of the rear trailer dock bumping structure, and higher up. They rarely show witness marks of impact, even on older trailers.

Figure 4F:
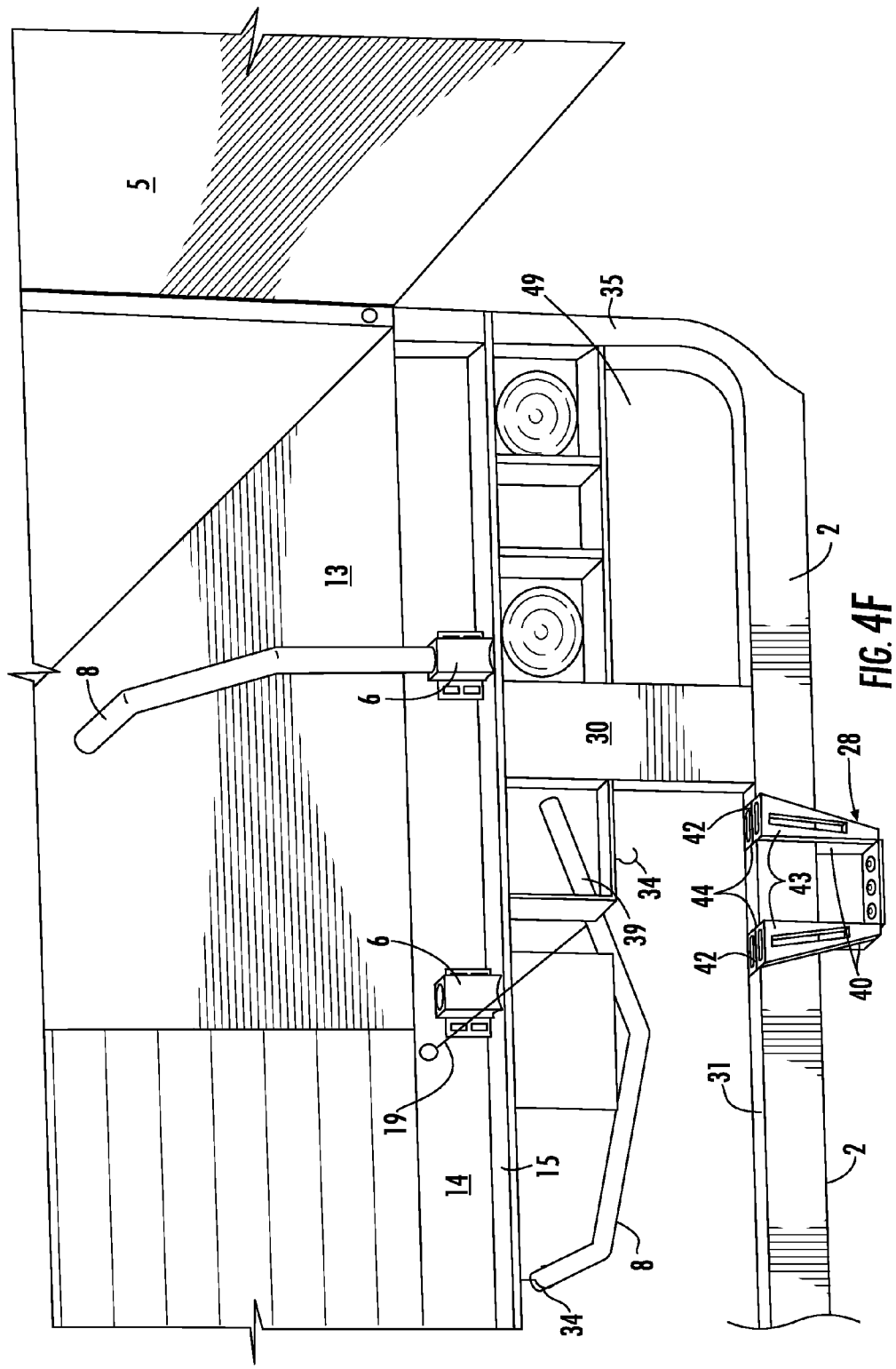
FIG. 4f is a more detailed rear isometric view of the rear cargo area of a semi-trailer, showing one preferred embodiment of an auxiliary step and hand hold system of the present invention, with the rotating-retractable step in the use position and one of the hand holds in a stowed position.

Referring to FIG. 4f, a further hand hold stowage approach, which seems to offer a good balance of advantages in most situations, would be to let the LH hand hold hang by the short steel cable, and latch its top end to the trailer structure via another latch 34 just under the doors. The cable length will allow nesting behind the license plate panel 70. The latch 34 could be a locking type. So secured, the hand hold will be tucked neatly up under the floor edge, behind the license plate; and either end-attachment, alone, could secure the hand hold if the other end failed for any reason—and without the loose end touching ground. Operators may wish to secure the LH hand hold in this manner, and the RH hand hold to a stowage pocket on the outer door. If the cable for the RH hand hold were anchored to the box edge (door hinge area) and the outer door stowage pocket were quite near the point-of-use pocket, then the cable would have about an equal (small) slack to either pocket. This is true whether the door is open to any angle, or closed. (Note: this same RH pocket tether anchor scheme for outer door stowage works equally well for RH pocket inner door stowage.) It avoids overlapping both hand holds in latched, under-floor stowage behind the license plate panel 70. All of the stowage approaches have advantages in some applications, and they use common parts, albeit with more pockets for on-door stowage.

Even if the operator forgets to return the hand hold to one of the pockets, and instead leaves it dangling 22 by its cable, in most cases the combined length of the cable and the hand hold can be selected such that the chosen mounting point would keep the rail comfortably above the ground.

Referring to FIGS. 1a-1e and 2a-2j, the choice of stowage in the functional pocket could provide a secondary, anti-theft function. A padlock bar 9 placed through the anti-rotation holes on the sidewalls of the pocket, and through a second set of matching holes in the hand hold, at 90 degrees to the anti-rotational holes, would further lock the rail in place, and prevent unauthorized opening of the trailer door (the LH door can not open with the RH door shut). To increase the effectiveness of the anti-theft function, a second (open-bottom) pocket 23 could be mounted to the outer door, immediately over the functional pocket, and the hand hold could be slid through this upper pocket into the lower (functional) pocket before padlocking—creating a giant "bolt-lock", with the hand hold being the "bolt." The steel cable keeps the rail close to the point-of-use. It is primarily the padlock that prevents theft. The padlock, too, might have a tether 21 to avoid misplacement, as might an alternate anti-rotational eye-bolt.

This hand hold system is also designed to work along the sides and back of a flat-bed trailer, where multiple pairs of pockets might employ the same pair of hand holds, giving access wherever needed. The present invention, for the first time, offers the required 4-points-of-contact, so that the recommended 3-continuous-points-of-contact can be maintained as each limb is sequentially released and raised during the climb. It also accommodates an overweight driver, by positioning a first step set back from the plane of the rear trailer (belly room). The forward incline of the hand holds promotes a center-of-gravity transfer, through the course of the climb. It helps keep an erect profile for most operators, and finishes with the climber safely forward from the aft edge of the floor, and leaning forward, with hand holds to steady him or her. Even in the case of foot slippage, balance is maintained with a comfortable, continuous grip for each hand—so that the climber should fall to his feet, not on his or her backside, risking hip, arm, shoulder and head injuries. The removable hand holds do not interfere with trailer door opening or with fork lift access at a dock. The cables help to avoid loss, misplacement, or theft of the hand holds. The system is protected against corrosion, and a polymer coating, impregnated with abrasive, can protect the user's hands from hot, cold, or slippage. And, the system can be adapted, as a secondary function, to resist unauthorized access to the cargo bay.

The latter anti-theft stowage scheme can be turned into a "giant bolt-lock" by affixing a second, open-bottom pocket to the outside of the RH door just above the first (functional) pocket at this point—and sliding the hand hold through the upper pocket, into the lower pocket, and padlocking.

A custom hand hold, compatible with this system, can include, by way of example and not limitation, the following features:

a) About a 0.100" thick wall, galvanized or zinc-plated steel tube, with zinc-rich paint inside;

b) About 40" in length;

c) With appropriate bends or curves to direct the CG of the climber over the initially vertical rear trailer structure, and then forward into the cargo bay, and away from the aft edge of the floor (all the while, the climber will remain comfortably erect, with a slight forward lean—away from the aft edge of the floor—and with the two hand holds to steady him or her);

d) The preferred embodiment will include a short section at the base of the hand hold that is squared to 1½"×1½" OD as a secondary anti-rotational mechanism—thus not requiring a pin, at all, if stowage is on the inner wall of the trailer door, adjacent to the point-of-use;

e) An optional short steel cable is anchored on the one end to the base of the hand hold just up from the top of the pocket, and on the other end to a solid point on the trailer, just below the rear edge of the floor, or in the RH door hinge area on the edge of the cargo box. The cable serves to prevent loss, misplacement or theft of the hand hold, permit comfortable removal after use, and stowage either back in the usage pocket (at 90 degrees to use), or in an inner or outer door stowage pocket (also at 90 degrees), or tucked behind the license plate panel, just below the rear edge of the floor, with a latch 34 securing the top end of the hand hold. Either end attachment is sufficient to retain the hand hold in the absence of the other. For many mounts, a short cable will also prevent the hand hold from striking the pavement, even if left dangling.

f) A polymer coating, or the like, may be applied to the hand hold to insulate the operator's hand from extreme hot or cold of exposed metal, and may be impregnated with abrasive, or other gripping means, to resist hand slippage on a dusty, wet, icy, muddy, or greasy hand hold.

Elements of this system can be used on the back and sides of a flat-bed trailer, and at heavy truck cab entry, and for access to a heavy truck 5th-wheel "catwalk", and for similar requirements in other vocations.

All steps taught herein, and in Ruehl's co-pending patent application, feature significant traction assists 60 on their stepping surfaces. We will now teach a new way to improve traction along the formed rounded radii at the outboard edges of the stepping surfaces.

Figure 8:
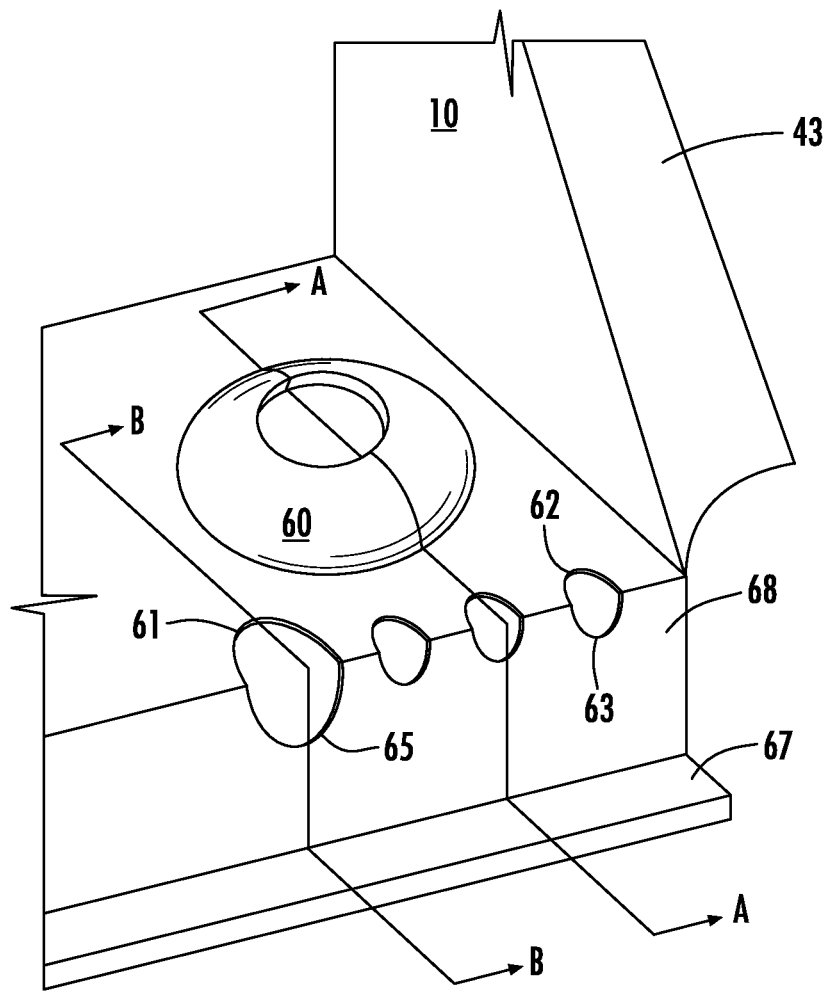
FIG. 8 shows a close-up isometric view of a portion of a step of the present invention, illustrating the integral edge radius traction holes and integral boot scraper lip of the present invention.
Figure 8A:
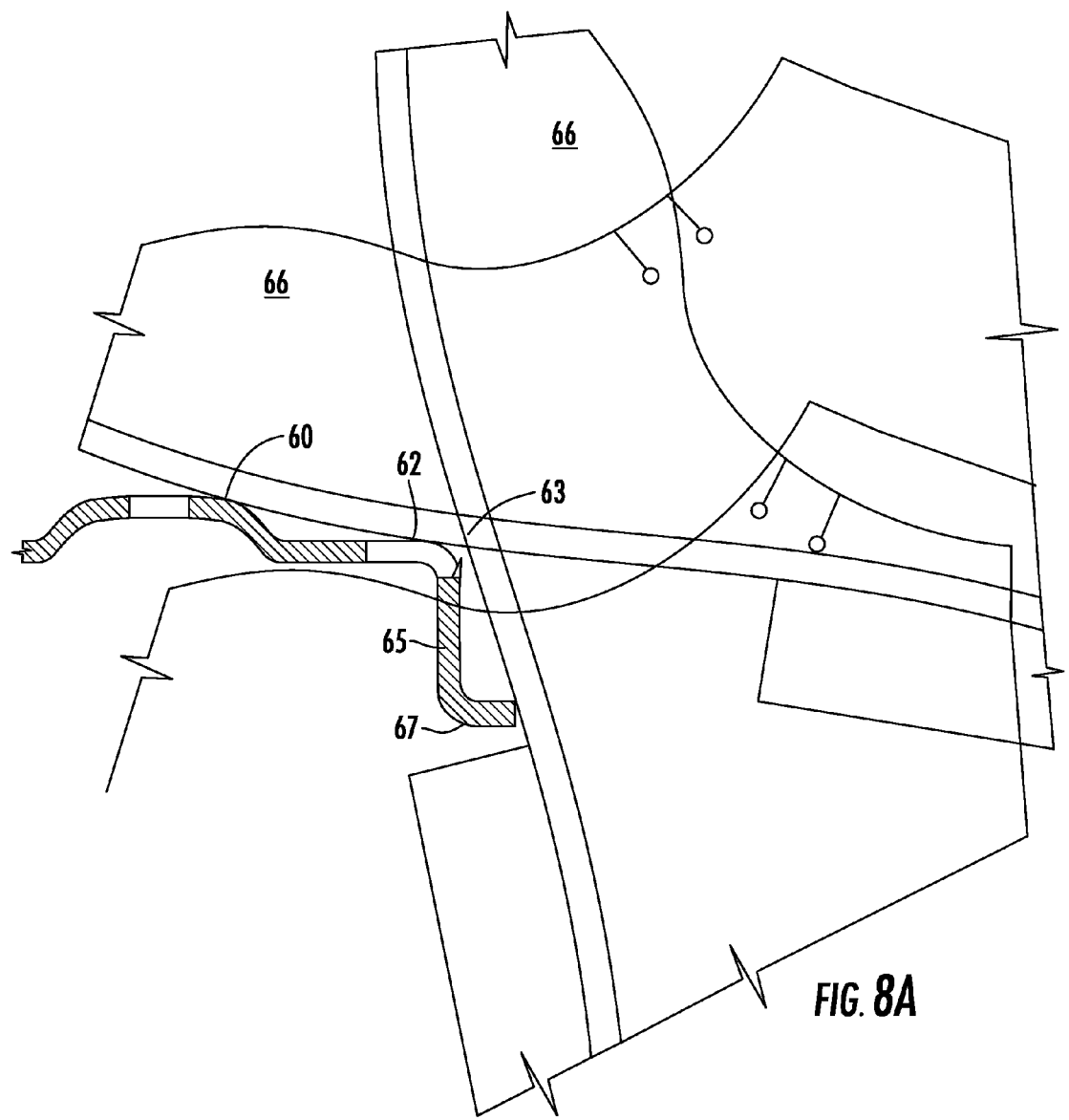
FIG. 8a is a cross-sectional view of the step of FIG. 8, taken along line A-A of FIG. 8.
Figure 8B:
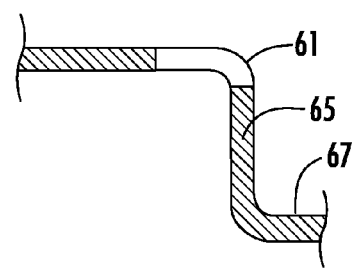
FIG. 8b is a cross-sectional view of the step of FIG. 8, taken along line B-B of FIG. 8.
Figure 9B:
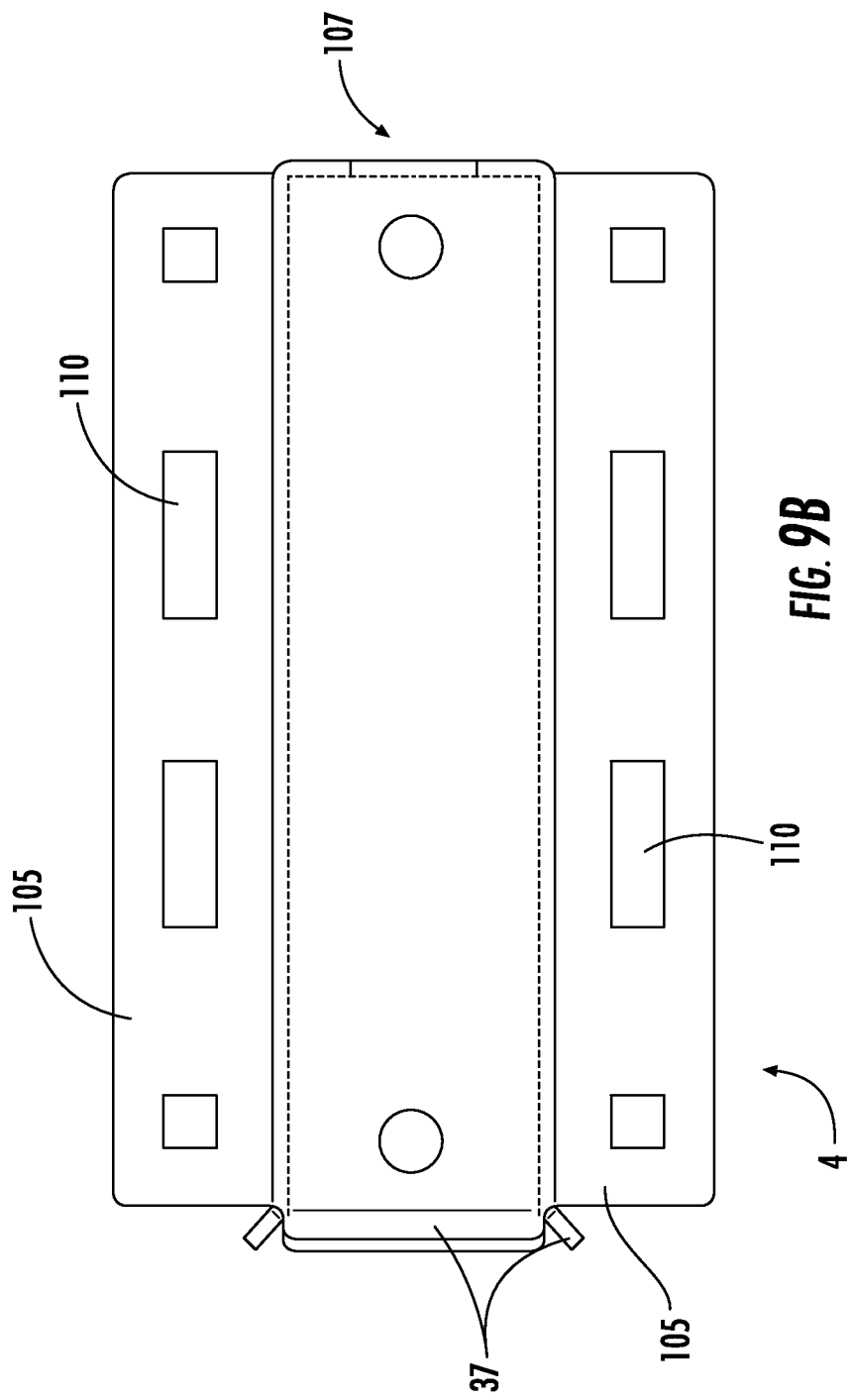
FIG. 9b is a rear elevational view of the finished hand hold pocket shown in FIG. 9a, after having been formed.

Referring to FIGS. 8-8b, various embodiments of raised traction holes 60 are used on many metal stepping surfaces. Some have also placed holes on the outboard edge of the stepping surface 61, which is often a smooth, rounded radius, and, thus, slippery. The outboard edge often takes a high portion of the bearing load. These edge holes help some, but not much, because the vertical side edges 64 of these holes are parallel to the direction of slip (down), and the bottom edges of the holes 65 are in the flat wall of the down-turned, vertical flange, where the sole of a boot can not touch it. In the course of our testing of a wide range of potential edge hole size, shape and placement variations, we uncovered a particularly effective embodiment. Small (about ¼") holes 62 are placed in the step's sheet-metal blank, at, or very near the bend radius of the future flange, which will be turned down from the horizontal stepping surface. The outboard edge of the hole will be drawn into the radius during forming of the flange. Without continuous metal above it to form a radius, the hole bottom will instead stick out from the rest of the formed radius, straight up 63, perpendicular to the stepping surface and the direction of slip. This forms a short, sharp "tooth," albeit one with a rounded, receding center at its most outstanding point. The comparison is best seen in the section cuts of FIGS. 8a and 8b. This has the pleasant effect that the tooth slightly "bites" into the sole of one's footwear 66. At the same time, the small size of the holes, and their rounded, falling-away bottom radii, means that they can rough-up skin during a fall, but are not likely to catch and tear skin. These small traction holes are quite effective, without being dangerous.

FIGS. 8-8b also show a short (about ¼-⅜") horizontal "lip" 67 extending out from the bottom of the edge support flange 68. This lip adds significantly to the stiffness of the edge, and provides a nice surface on which to scrape off snow, salt, mud, etc.), before entering the truck cab or other enclosure (cargo bay, sleeper cab, motor home, etc.) to which the step is mounted. By keeping the "lip" short, relative to the height of the down-turned flange, one must arch one's toes back to use it. Thus, it does not get in the way during a normal climb, and poses little risk in a fall. These two features, again, may apply to all steps here-in claimed, to those cited in our co-pending patent applications, and to other sheet-metal stepping surfaces.

Virtually living in their truck cab, many drivers (especially owner-operators) are very conscious of keeping it clean. Referring to FIG. 7, there are many varieties of "boot cleaners" on the market, for attaching to the top surface of existing cab steps. These often use "artificial turf" 69, or other doormat material, or various types of brushes. They are quite popular. Such material can be easily added to the auxiliary steps of the present invention and those previously disclosed by Ruehl to provide this secondary function at little cost. Most of the steps have vertical sides, as-well-as a stepping surface, on which to mount such doormat material—and thus may provide a more thorough boot cleaning than existing options.

Combining the "scraper edge" and the "artificial turf" on the stationary step 36 herein defined, we might arrive at the top-mounted step 36 shown in FIG. 7. In addition to working at various points on a heavy truck cab or trailer, it might find use on a motor home—whether or not the step is needed to aid access. In a like manner one might be mounted at the back door to a home, to reduce the tracked-in dirt, etc.

Of course, variations in geometry, materials, coatings, etc. can be used without departing from the concepts claimed here-in; and the same concepts can be applied to other vocations than heavy truck. Although the invention has been herein shown and described in what is perceived to be the most practical and preferred embodiments, it is to be understood that the invention is not intended to be limited to the specific embodiments set forth above. Rather, it is recognized that modifications may be made by one of skill in the art of the invention without departing from the spirit or intent of the invention and, therefore, the invention is to be taken as including all reasonable equivalents to the subject matter of the appended claims and the description of the invention herein. In particular, the preferred embodiments of the present invention described herein use certain features of auxiliary steps described in Ruehl's other pending applications—though other embodiments in those applications, or still other concepts, might be similarly hinged or pivoted for this application without departing from the intent of this teaching.

What is claimed is:

1. An auxiliary step and hand hold system for accessing the cargo bay of a trailer, the trailer having an under-ride guard beam, a floor and at least one door, the auxiliary step and hand hold system comprising:
a rotating-retractable step mountable to the under-ride guard beam, wherein the rotating-retractable step can be positioned below the under-ride guard beam in a use position and above the under-ride guard beam in a stowed position;
a first pocket and a second pocket, both mountable to the trailer at a level lower than the at least one door and above the rotating-retractable step; and
a first hand hold and a second hand hold, each shaped to assist a climb into the cargo bay and insertable into the pockets in a use position;
further comprising a first cable attached to the first hand hold and the trailer and a second cable attached to the second hand hold and the trailer.

2. The step and hand hold system of claim 1, wherein the rotating-retractable step includes at least one mounting portion configured to be attached to the under-ride guard beam, a horizontal step member having at least an upwardly facing stepping surface, and a pair of side supports extending between the at least one mounting portion and the horizontal step member, wherein each of the side supports is connected to the mounting portion with a hinge pin and pin retainer.

3. The step and hand hold system of claim 1, wherein the rotating-retractable step includes at least one mounting portion configured to be attached to the under-ride guard beam, a horizontal step member having at least an upwardly facing stepping surface, and a pair of side supports extending between the at least one mounting portion and the horizontal step member, wherein the side supports are connected to the mounting portion with a pivot tab and pivot bolt or drive screw.

4. The step and hand hold system of claim 1, further comprising a stationary step with horizontal step member, wherein the stationary step is mounted on the under-ride guard beam such that the horizontal step member of the stationary step is positioned above the under-ride guard beam and the rotating-retractable step when the rotating-retractable step is in the use position.

5. The step and hand hold system of claim 1, further comprising a stationary step mounted in between the under-ride guard beam and the floor of the trailer.

6. The step and hand hold system of claim 1, further comprising a third pocket and a fourth pocket mounted on an inner surface of the at least one door of the trailer.

7. The step and hand hold system of claim 1, wherein the rotating-retractable step has an upwardly facing stepping surface including an outside edge, and a plurality of holes formed along the outside edge, wherein at least a portion of the holes include a tooth that extends substantially perpendicular the stepping surface.

8. The step and hand hold system of claim 2, wherein the pin retainer is integrally formed with the side support and mounting portion.

9. An auxiliary step and hand hold system for accessing the cargo bay of a trailer, the trailer having an under-ride guard beam, a floor and at least one door, the auxiliary step and hand hold system comprising:
- a rotating-retractable step mountable to the under-ride guard beam, wherein the rotating-retractable step can be positioned below the under-ride guard beam in a use position and above the under-ride guard beam in a stowed position;
- a first pocket and a second pocket, both mountable to the trailer at a level lower than the doors and above the rotating-retractable step; and
- a first hand hold and a second hand hold, each shaped to assist a climb into the cargo bay and insertable into the pockets in a use position;
- wherein the rotating-retractable step includes a stepping surface with an edge support flange and a horizontal scraping lip extending from the bottom of the edge support flange outwardly away from the under-ride guard beam.

10. The step and hand hold system of claim 9, wherein the rotating-retractable step includes at least one mounting portion configured to be attached to the under-ride guard beam, a horizontal step member having at least an upwardly facing stepping surface, and a pair of side supports extending between the at least one mounting portion and the horizontal step member, wherein each of the side supports is connected to the mounting portion with a hinge pin and pin retainer.

11. The step and hand hold system of claim 9, wherein the rotating-retractable step includes at least one mounting portion configured to be attached to the under-ride guard beam, a horizontal step member having at least an upwardly facing stepping surface, and a pair of side supports extending between the at least one mounting portion and the horizontal step member, wherein the side supports are connected to the mounting portion with a pivot tab and pivot bolt or drive screw.

12. The step and hand hold system of claim 9, further comprising a stationary step with horizontal step member, wherein the stationary step is mounted on the under-ride guard beam such that the horizontal step member of the stationary step is positioned above the under-ride guard beam and the rotating-retractable step when the rotating-retractable step is in the use position.

13. The step and hand hold system of claim 9, further comprising a stationary step mounted in between the under-ride guard beam and the floor of the trailer.

14. The step and hand hold system of claim 9, further comprising a third pocket and a fourth pocket mounted on an inner surface of the at least one door of the trailer.

15. An auxiliary step and hand hold system for accessing a trailer having a cargo area and an under-ride guard beam, the auxiliary step and hand hold system comprising: at least one rotating-retractable horizontal step having an upwardly facing stepping surface, two side support legs and at least one mounting portion configured to be attached to the under-ride guard beam; the side support legs extending between the at least one mounting portion and the at least one rotating-retractable horizontal step; each of the side support legs is connected to the mounting portion with a hinge pin and pin retainer; at least one hand hold shaped to assist a climb into the trailer; at least one pocket shaped to removably receive the at least one hand hold; wherein the at least one hand hold is removably insertable into the at least one pocket in a use position and a stowed position without extending into the cargo area of the trailer; and, a stationary step with a horizontal step member, wherein the stationary step is mounted on the under-ride guard beam such that the horizontal step member of the stationary step is positioned above the under-ride guard beam and the rotating-retractable horizontal step when the rotating-retractable horizontal step is in the use position.

16. The step and hand hold system of claim 15, further comprising a second hand hold shaped to assist a climb into the trailer; and a second pocket shaped to removably receive the second hand hold.

17. The step and hand hold system of claim 15, wherein the pin retainer is integrally formed with the side support and mounting portion.

18. The step and hand hold system of claim 15, wherein the side support legs are connected to the mounting portion with a pivot tab and pivot bolt or drive screw.

19. The step and hand hold system of claim 16, further comprising a third pocket and a fourth pocket mounted on an inner surface of the at least one door of the trailer.

* * * * *